(12) United States Patent
Brendel

(10) Patent No.: US 12,012,982 B2
(45) Date of Patent: Jun. 18, 2024

(54) CONNECTION ARRANGEMENTS, DOWEL AND FURNITURE

(71) Applicant: IKEA SUPPLY AG, Pratteln (CH)

(72) Inventor: Stefan Brendel, Markaryd (SE)

(73) Assignee: IKEA SUPPLY AG, Pratteln (CH)

( * ) Notice: Subject to any disclaimer, the term of this patent is extended or adjusted under 35 U.S.C. 154(b) by 0 days.

(21) Appl. No.: 18/141,169

(22) Filed: Apr. 28, 2023

(65) Prior Publication Data

US 2023/0265875 A1 Aug. 24, 2023

Related U.S. Application Data

(63) Continuation of application No. 17/274,472, filed as application No. PCT/SE2019/050835 on Sep. 5, 2019, now Pat. No. 11,674,539.

(30) Foreign Application Priority Data

Sep. 12, 2018 (SE) .................................... 1851077-6

(51) Int. Cl.
*F16B 12/02* (2006.01)
*F16B 12/10* (2006.01)

(52) U.S. Cl.
CPC ........ *F16B 12/10* (2013.01); *F16B 2012/103* (2013.01)

(58) Field of Classification Search
CPC .......... F16B 12/02; F16B 12/10; F16B 12/22; F16B 12/24; F16B 12/40; F16B 12/46;
(Continued)

(56) References Cited

U.S. PATENT DOCUMENTS 3,159,440 A * 12/1964 Courtwright .......... A47B 47/03
52/285.3
4,676,040 A * 6/1987 Monaghan ............. A47B 87/02
403/381
(Continued)

FOREIGN PATENT DOCUMENTS

BE 677183 A 7/1966
CN 1425097 A 6/2003
(Continued)

OTHER PUBLICATIONS

International Search Report for International Application No. PCT/SE2019/050835 dated Oct. 24, 2019 (4 pages).
(Continued)

*Primary Examiner* — Daniel J Wiley
(74) *Attorney, Agent, or Firm* — Merchant & Gould P.C.

(57) ABSTRACT

A connection arrangement for connecting a first furniture part (10) to a second furniture part (20), wherein the first furniture part (10) comprises: a dowel (11) and one or more abutment surfaces (13) extending circumferentially (C) around or being distributed circumferentially (C) around the dowel (11), wherein the second furniture part (20) comprises: a through-going opening (22) extending through a wall (21) and one or more abutment surfaces (23) extending circumferentially (C) around or being distributed circumferentially (C) around the through-going opening (22), wherein the connection arrangement further comprises a connection member (30) having a recess (31), the recess (31) having a locking portion (31*b*) being configured to receive the dowel (11) by a relative motion between the connection member (30) and the first furniture part (10) in a direction transverse (T) to the longitudinal direction (L) and being configured to interact with the neck portion (11*b*) of the dowel (11) to (Continued)

counteract removal of the dowel (11) from the locking portion (31*b*) along the longitudinal direction (L).

15 Claims, 15 Drawing Sheets

(58) Field of Classification Search
CPC ......... A47B 47/03; A47B 87/02; A47B 96/06; E04H 17/1447; E04H 17/1417; E04H 17/1413
See application file for complete search history.

(56) References Cited

U.S. PATENT DOCUMENTS

| | | |
|---|---|---|
| 4,770,560 A | 9/1988 | Ott |
| 6,347,592 B1 | 2/2002 | Gessert |
| 6,711,865 B2 | 3/2004 | Chaudoreille |
| 2010/0307995 A1 | 12/2010 | Davison, III et al. |

FOREIGN PATENT DOCUMENTS

| | | |
|---|---|---|
| CN | 10190611 A | 12/2010 |
| CN | 106337863 A | 1/2017 |
| DE | 2546751 A1 | 4/1977 |
| DE | 102007058662 A1 | 6/2009 |
| EP | 2177773 A1 | 4/2010 |
| IT | PN20110012 A1 | 8/2012 |
| JP | S6019806 U | 2/1985 |
| SE | 1551662 A1 | 7/2017 |
| WO | 03059120 A1 | 7/2003 |

OTHER PUBLICATIONS

Extended European Search Report for EP Application No. 19860303.7 dated May 2, 2022 (8 pages).
Chinese Office Action for CN Application No. 201980059532 dated Jun. 14, 2022 (18 pages, with English Translation).

* cited by examiner

CONNECTION ARRANGEMENTS, DOWEL AND FURNITURE

This application is a Continuation of U.S. patent application Ser. No. 17/274,472, filed on 09 Marc. 2021, which is a National Stage Application of PCT/SE2019/050835, filed 5 Sep. 2019, which claims benefit of Ser. No. 1851077-6, filed 12 Sep. 2018 in Sweden and which applications are incorporated herein by reference. To the extent appropriate, a claim of priority is made to each of the above disclosed applications.

FIELD OF INVENTION

The invention relates to a connection arrangement for connecting a first furniture part to a second furniture part. The invention also relates to a connection arrangement for connecting a third furniture part to a second furniture part. The invention also relates to a dowel configured to be attached to a tubular furniture part, which may be said second furniture part. The invention also relates to a connection arrangement for connecting the third furniture part to the second furniture part using the dowel. The invention also relates to a furniture comprising a first furniture part, a second furniture part and a third furniture part, the furniture parts being connected to each other using said connection arrangements.

Technical Background

Within the field of furniture assembly, it is often desired to connect furniture parts to each other. Furniture parts may be connected by fastening means, such as screws or nails. A problem with such fastening means is the need for tools, and sometimes specific tools, in order to apply them. They are often also sensitive to incorrect positioning; for instance, incorrectly hammering a nail may lead to bending of the nail and/or damages to the furniture part, or even personal injury. The tools may also be difficult to use, especially for the disabled or elderly. Furthermore, the fastening means themselves may be prone to be lost, or dangerous for small children. Furniture parts may also be connected with different kinds of locks. However, these may also require many parts, and may not present strong connections when subjected to wear over time.

For at least the reasons described above, a need exists for better ways to connect furniture parts.

SUMMARY OF INVENTION

It is an object of the invention to at least mitigate some of the problems mentioned in the background.

This object has been achieved by a connection arrangement for connecting a first furniture part to a second furniture part, wherein the first furniture part comprises:

a dowel extending from the first furniture part along a longitudinal direction towards a free end of the dowel, the dowel having at least one neck portion, and one or more abutment surfaces, wherein the second furniture part comprises:

a through-going opening extending through a wall of said second furniture part, and one or more abutment surfaces on a first side of the wall, the first side facing in a direction opposite the longitudinal direction, the one or more abutment surfaces extending at least partially circumferentially around or being distributed at least partially circumferentially around the through-going opening, wherein the connection arrangement further comprises a connection member having a recess, the recess having a locking portion being configured to receive the dowel by a relative motion between the connection member and the first furniture part in a direction transverse to the longitudinal direction and being configured to interact with the neck portion of the dowel to counteract removal of the dowel from the locking portion along the longitudinal direction, wherein the first furniture part and the second furniture part are configured to be connected to each other by inserting the dowel through the through-going opening from the first side in an insertion direction along the longitudinal direction and bringing said abutment surfaces of the first and second furniture parts into contact with each other, and positioning the connection member on a second side, opposite the first side, of the wall and moving the connection member relative to the dowel in a travel direction along the transverse direction such that the dowel slides into the locking portion, wherein abutment surfaces of the first furniture part have an extension in the longitudinal direction along a portion of the dowel and extending at least partially circumferentially around or being distributed at least partially circumferentially around the dowel, wherein the abutment surfaces of the second furniture part extend from the first side of the wall in a direction opposite the longitudinal direction and extend at least partially circumferentially around or is at least partially circumferentially distributed around the through-going opening, and wherein the one or more abutment surfaces of the first furniture part and the one or more abutment surfaces of the second furniture part are positioned on the respective furniture part such that, as the dowel is inserted into the through-going opening, the one or more abutment surfaces of the first furniture part abut the one or more abutment surfaces of the second furniture part and counteract relative movement between the first and second furniture parts along a direction transverse to the longitudinal direction, preferably all directions being transverse, to the longitudinal direction.

The second furniture part will thereby be correctly positioned and oriented relative to the first furniture part and the connection member may be moved with ease and still provide a strong and stable connection between the first and second furniture part.

It may be noted that the wordings first, second and third are merely labels. The same label is used for the same part through-out the description and the claims. This may result in that in a specific part of the description related to a specific connection arrangement there may be referred to a second and a third furniture part although there is in that context no mention of any first furniture part. However, it may be noted that since the wordings first, second and third are merely labels, it is conceivable to relabel the furniture parts in the different parts of the description and in the different claims such that the labels first, second and third are introduced e.g. in the order of appearance of that specific claim and in the associated description. However, since a single furniture may comprise a first, a second and a third furniture part and include two or more of the different connection arrangements disclosed herein, the same label is used for the same part through-out the description and the claims rather than relabeling them in relation to the different connection arrangements.

It may be noted that the expression furniture part may relate to different kinds of furniture. It may e.g. relate to separate free standing furniture, such as shelves, book shelves, TV-benches, side boards, tables, cupboards, etc. It may also relate to built-in cabinets or shelves, such as wall-hanged kitchen cabinets, wall-hanged kitchen shelves, etc. It may also relate to semi-built-in cabinets or shelves, such as wall hanged TV-benches, etc. Irrespective of it is built-in or free standing it may not only relate to furniture designed for storage, such as cabinets and shelves, but may also relate to furniture parts for furniture for other kinds of use. It may e.g. relate to furniture for sitting, such as sofas, benches, chairs, etc.

By providing such a connection arrangement with the dowel, the through-going opening, the abutment surfaces of the first and second furniture part, and the connection member formed to interact with the dowel and the second side of the second furniture part, it is possible to provide a strong connection between the first and second furniture parts with a connection arrangement that may be assembled into a locking engagement without the use of any tools.

The design with the abutments surfaces and their positioning around the through-going opening and around the dowel provides a strong yet compact design. The design of the connection arrangement is especially useful for connecting tubular furniture parts to each other, where especially the tubular shape of the first furniture part may be used as the abutment surfaces of the first part and may be used to cover the connection arrangement.

Moreover, the connection member may e.g. be inserted through an open end of the second furniture part and may as such also be used to provide an end cover to the open end.

The one or more abutment surfaces of the first furniture part may comprise a tubular section extending along the longitudinal direction and extending circumferentially around a base portion of the dowel. Such a design provides a strong abutment surface, makes the abutment surface easy to manufacture and makes it possible to cover the connection arrangement inside the tubular section. There is preferably a circumferentially extending gap between the base portion and the abutment surface formed by the tubular section.

The one or more abutment surfaces of the second furniture part are configured to be arranged inside and abut one or more abutments surfaces on an inside of the tubular section. Such a design provides a strong abutment surface, makes the abutment surface easy to manufacture and makes it possible to cover the connection arrangement inside the tubular section.

The one or more abutment surfaces of the second furniture part comprises a tubular section extending from the first side of the wall in the direction opposite the longitudinal direction and extending circumferentially around the though-going opening. Such a design provides a strong abutment surface and makes the abutment surface easy to manufacture.

The dowel of the first furniture part may comprise a base portion having an abutment surface adapted to, when the dowel is inserted through the through-going opening of the wall, abut an inner surface of said through-going opening. This may be used to provide a strong and distinct positioning of the first furniture part relative to the second furniture part. If the base portion fits snugly into the through-going opening, the first and second furniture parts will be positioned with precision in any direction in the plane of the wall of the second furniture part.

The recess has an entrance opening in a first surface forming a corner together with a second surface, the first surface being intended to face in the travel direction and the second surface being intended to face the wall of the second furniture part. Such a recess may be said to be an open ended recess. Designing the connection member with such a recess makes it easy to use; the user can position the first and second furniture parts in their intended position and then in a straight-forward motion push the connection member over the dowel such that the first and second furniture parts becomes interconnected. Such a design also facilitates manufacture of the connection member. The connection member may e.g. be injection moulded in a single step process since the entrance opening may be used as an extraction way for a removable core in an injection moulding tool with the core having the shape of the recess.

The recess has a depth as seen from the second surface along a depth direction extending along the longitudinal direction and may, as seen along the depth direction, be provided with at least one neck section configured to interact with the neck portion of the dowel. The neck section may be formed by two oppositely arranged internal ridges extending along the second surface and facing each other. Such a design provides a strong connection and is easy to manufacture. The design is especially suitable in combination with an open ended recess since the ridges extending along the second surface allows for the extraction of a removable core in an injection moulding tool. In a preferred embodiment, there is provided two neck sections one after the other as seen along the depth direction.

The first furniture part may be a tubular member having a main extension along the longitudinal direction, wherein the dowel is positioned partly into an open end of the tubular member such that it partly extends inside the tubular member and partly extends past the tubular member along the longitudinal direction. As mentioned above, there is preferably a circumferentially extending gap between the base portion and the abutment surface formed by the tubular section.

The dowel may be a separate element being attached to the first furniture part. The dowel may e.g. be attached to the first furniture part by an attachment portion being positioned further into the tubular member than the base portion.

The second furniture part may be a tubular member having an open end facing in a direction opposite the travel direction of the connection member and having a main extension along the transverse direction. This is advantageous in that the connection member may be inserted into the tubular member and be moved along the travel direction to the locking position in a single straight-forward motion.

The above mentioned object has also been achieved by a furniture comprising a second furniture part and a third furniture part, wherein the first and second furniture parts are connected to each other by a connection arrangement as introduced above and as disclosed in more detail with reference to the detailed description and the appended drawings, wherein the third furniture part is tubular, has an open end facing in a longitudinal direction and has a main extension along the longitudinal direction, wherein the second furniture part comprises or is configured to receive a dowel extending from the second furniture part along a direction opposite the longitudinal direction towards a free end of the dowel, wherein the dowel has at least one ridge followed, as seen along the longitudinal direction, by at least one valley, wherein the second and third furniture parts are connected to each other by a connection arrangement which comprises:

a connection member having a recess and being configured to be inserted through the open end and into the third furniture part, wherein the recess has a locking portion being configured to receive the dowel by a relative motion between the third furniture part and the connection member in a direction transverse to the longitudinal direction and being configured to interact with the valley of the dowel to counteract removal of the dowel from the locking portion along the longitudinal direction, wherein the second furniture part and the third furniture part are configured to be connected to each other by inserting the connection member at least partly into the third furniture part, and moving the third furniture part with the connection member relative to the dowel in a travel direction along the transverse direction such that the dowel slides into the locking portion of the connection member.

By using a connection member with such a designed recess and at least partly inserting it into the third furniture part in combination with the use of such a designed dowel it is possible to provide a strong connection of a tubular furniture part to a second furniture part and it is possible to provide a connection arrangement being covered by the tubular furniture part and a cover plate on the dowel.

As mentioned above, it may be noted that the wordings first, second and third are merely labels. The same label is used for the same part through-out the description and the claims. This result in that in this specific part of the description related to this specific connection arrangement there is referred to a second and a third furniture part although there is in this context no mention of any first furniture part. However, it may be noted that since the wordings first, second and third are merely labels, it is conceivable to relabel the furniture parts in the different parts of the description and in the different claims such that the labels first, second and third are introduced e.g. in the order of appearance of that specific claim and in the associated description. However, since a single furniture may comprise a first, a second and a third furniture part and include the initially disclosed connection arrangement and also this immediately above disclosed connection arrangement, the same label is used for the same part through-out the description and the claims rather than relabeling them in relation to the different connection arrangements.

The dowel may be configured to be attached to a tubular furniture part and to provide a part of a connection arrangement between the tubular furniture part and a third furniture part, whereby the dowel may comprise a connection portion having at least one ridge followed, as seen along a longitudinal direction, by at least one valley, wherein the connection portion is configured to extend from the second furniture part along a direction opposite the longitudinal direction towards a free end of the dowel, and an attachment portion having a neck portion followed, as seen along the longitudinal direction by a head portion, the head portion having in a first transverse direction an extension being greater than an extension of the neck portion in said first transverse direction and being greater than an extension of the head portion and an extension of the neck portion in a second transverse direction being orthogonal to the first transverse direction, wherein the dowel is configured to be attached to the tubular furniture part by inserting the attachment portion in an elongated through-going opening extending through a first wall of the tubular furniture part, wherein the dowel is during the insertion oriented with the first transverse direction being aligned with, or at least having a major component along, a longitudinal direction of the elongated through-going opening such that the head portion passes through the elongated through-going opening, and thereafter rotating the dowel in a first direction about an axis extending along the longitudinal direction such that the head portion interacts with an inside of the wall such that the head is prevented from being pulled out of the through-going opening.

A dowel of this kind is easy to attach to a tubular furniture part and it is capable of providing a strong connection arrangement by being securely attached to the tubular furniture part and by presenting a connecting portion capable of providing a strong connection with a recess having internal ridges interacting with the ridge and valley of the connection portion.

At least one end, preferably both ends, as seen along the first transverse direction, of the neck portion, may have a rotation blocking corner configured to interact with an edge of the elongated opening to thereby prevent rotation of the dowel in a second direction, opposite the first direction, about the axis, and a rotation allowing corner configured to pass along an edge of the elongated opening to thereby allowing rotation of the dowel in the first direction about the axis.

Thereby the dowel may be rotated from the orientation it has when being inserted to an intended orientation in which the dowel is stopped from further rotation.

Preferably are both ends each provided with a rotation blocking corner and a rotation allowing corner wherein the two rotation blocking corners are arranged diagonally relative to each other and the two rotation allowing corners are arranged diagonally relative to each other.

The head portion may be asymmetric in its design and the elongated opening may be asymmetric in its design such that the head of the dowel is only insertable with the first transverse direction in one of two opposing orientations in which the first transverse direction is aligned with or has a major component along the longitudinal direction of the elongated through-going hold.

Thereby it may be controlled that the dowel is only insertable in the orientation that will, in combination with the rotation blocking and rotation allowing corners result in the intended orientation of the dowel.

In the above disclosed connection arrangement for connecting a third furniture part to a second furniture part, the second furniture part may be a tubular furniture part provided with an elongated through-going opening extending through a first wall of the tubular furniture part, and the dowel may be designed in accordance with the disclosure above in its most generic terms or in the preferred embodiments of the dowel.

The elongated through-going opening preferably has a width along a transverse direction of the elongated through-going opening being greater than the extension of the head portion and neck portion along the second transverse direction and being smaller than the extension of the head portion along the first transverse direction.

In one preferred embodiment, the inventive concept is realised in a furniture comprising a first furniture part, a second furniture part and a third furniture part, wherein the first and second furniture parts are connected to each other by the connection arrangement for connecting a first furniture part to a second furniture part as disclosed above in its most generic terms or in the preferred embodiments, and wherein the first and third furniture parts are connected to each other by the connection arrangement for connecting a second furniture part to a second furniture part as disclosed above in its most generic terms or in the preferred embodiments.

The above mentioned object has also been achieved by a connection arrangement for connecting a third furniture part to a second furniture part, wherein the third furniture part is tubular, has an open end facing in a longitudinal direction and has a main extension along the longitudinal direction, wherein the second furniture part comprises or is configured to receive a dowel extending from the second furniture part along a direction opposite the longitudinal direction towards a free end of the dowel, wherein the dowel has at least one ridge followed, as seen along the longitudinal direction, by at least one valley, wherein the connection arrangement further comprises:

a connection member having a recess and being configured to be inserted through the open end and into the third furniture part, wherein the recess has a locking portion being configured to receive the dowel by a relative motion between the third furniture part and the connection member in a direction transverse to the longitudinal direction and being configured to interact with the valley of the dowel to counteract removal of the dowel from the locking portion along the longitudinal direction, wherein the second furniture part and the third furniture part are configured to be connected to each other by inserting the connection member at least partly into the third furniture part, and moving the third furniture part with the connection member relative to the dowel in a travel direction along the transverse direction such that the dowel slides into the locking portion of the connection member.

By using a connection member with such a designed recess and at least partly inserting it into the third furniture part in combination with the use of such a designed dowel it is possible to provide a strong connection of a tubular furniture part to a second furniture part and it is possible to provide a connection arrangement being covered by the tubular furniture part and a cover plate on the dowel.

As mentioned above, it may be noted that the wordings first, second and third are merely labels. The same label is used for the same part through-out the description and the claims. This result in that in this specific part of the description related to this specific connection arrangement there is referred to a second and a third furniture part although there is in this context no mention of any first furniture part. However, it may be noted that since the wordings first, second and third are merely labels, it is conceivable to relabel the furniture parts in the different parts of the description and in the different claims such that the labels first, second and third are introduced e.g. in the order of appearance of that specific claim and in the associated description. However, since a single furniture may comprise a first, a second and a third furniture part and include the initially disclosed connection arrangement and also this immediately above disclosed connection arrangement, the same label is used for the same part through-out the description and the claims rather than relabeling them in relation to the different connection arrangements.

The above mentioned object has also been achieved by a dowel configured to be attached to a tubular furniture part and to provide a part of a connection arrangement between the tubular furniture part and a third furniture part, the dowel comprising a connection portion having at least one ridge followed, as seen along a longitudinal direction, by at least one valley, wherein the connection portion is configured to extend from the second furniture part along a direction opposite the longitudinal direction towards a free end of the dowel, and an attachment portion having a neck portion followed, as seen along the longitudinal direction by a head portion, the head portion having in a first transverse direction an extension being greater than an extension of the neck portion in said first transverse direction and being greater than an extension of the head portion and an extension of the neck portion in a second transverse direction being orthogonal to the first transverse direction, wherein the dowel is configured to be attached to the tubular furniture part by inserting the attachment portion in an elongated through-going opening extending through a first wall of the tubular furniture part, wherein the dowel is during the insertion oriented with the first transverse direction being aligned with, or at least having a major component along, a longitudinal direction of the elongated through-going opening such that the head portion passes through the elongated through-going opening, and thereafter rotating the dowel in a first direction about an axis extending along the longitudinal direction such that the head portion interacts with an inside of the wall such that the head is prevented from being pulled out of the through-going opening.

A dowel of this kind is easy to attach to a tubular furniture part and it is capable of providing a strong connection arrangement by being securely attached to the tubular furniture part and by presenting a connecting portion capable of providing a strong connection with a recess having internal ridges interacting with the ridge and valley of the connection portion.

At least one end, preferably both ends, as seen along the first transverse direction, of the neck portion, may have a rotation blocking corner configured to interact with an edge of the elongated opening to thereby prevent rotation of the dowel in a second direction, opposite the first direction, about the axis, and a rotation allowing corner configured to pass along an edge of the elongated opening to thereby allowing rotation of the dowel in the first direction about the axis.

Thereby the dowel may be rotated from the orientation it has when being inserted to an intended orientation in which the dowel 51 is stopped from further rotation.

Preferably are both ends each provided with a rotation blocking corner and a rotation allowing corner wherein the two rotation blocking corners are arranged diagonally relative to each other and the two rotation allowing corners are arranged diagonally relative to each other.

The head portion may be asymmetric in its design and the elongated opening may be asymmetric in its design such that the head of the dowel is only insertable with the first transverse direction in one of two opposing orientations in which the first transverse direction is aligned with or has a major component along the longitudinal direction of the elongated through-going hold.

Thereby it may be controlled that the dowel is only insertable in the orientation that will, in combination with the rotation blocking and rotation allowing corners result in the intended orientation of the dowel.

In the above disclosed connection arrangement for connecting a third furniture part to a second furniture part, the second furniture part may be a tubular furniture part provided with an elongated through-going opening extending through a first wall of the tubular furniture part, and the dowel may be designed in accordance with the disclosure above in its most generic terms or in the preferred embodiments of the dowel.

The elongated through-going opening preferably has a width along a transverse direction of the elongated through-going opening being greater than the extension of the head portion and neck portion along the second transverse direction and being smaller than the extension of the head portion along the first transverse direction.

The above mentioned object has also been achieved by a connection arrangement for connecting a third furniture part to a second furniture part, wherein the third furniture part is tubular, has an open end facing in a longitudinal direction and has a main extension along the longitudinal direction, wherein the second furniture part comprises or is configured to receive a dowel extending from the second furniture part along a direction opposite the longitudinal direction towards a free end of the dowel, wherein the dowel has at least one ridge followed, as seen along the longitudinal direction, by at least one valley, wherein the connection arrangement further comprises:

a connection member having a recess and being configured to be inserted through the open end and into the third furniture part, wherein the recess has a locking portion being configured to receive the dowel by a relative motion between the third furniture part and the connection member in a direction transverse to the longitudinal direction and being configured to interact with the valley of the dowel to counteract removal of the dowel from the locking portion along the longitudinal direction, wherein the second furniture part and the third furniture part are configured to be connected to each other by inserting the connection member at least partly into the third furniture part, and moving the third furniture part with the connection member relative to the dowel in a travel direction along the transverse direction such that the dowel slides into the locking portion of the connection member.

By using a connection member with such a designed recess and at least partly inserting it into the third furniture part in combination with the use of such a designed dowel it is possible to provide a strong connection of a tubular furniture part to a second furniture part and it is possible to provide a connection arrangement being covered by the tubular furniture part and a cover plate on the dowel.

As mentioned above, it may be noted that the wordings first, second and third are merely labels. The same label is used for the same part through-out the description and the claims. This result in that in this specific part of the description related to this specific connection arrangement there is referred to a second and a third furniture part although there is in this context no mention of any first furniture part. However, it may be noted that since the wordings first, second and third are merely labels, it is conceivable to relabel the furniture parts in the different parts of the description and in the different claims such that the labels first, second and third are introduced e.g. in the order of appearance of that specific claim and in the associated description. However, since a single furniture may comprise a first, a second and a third furniture part and include the initially disclosed connection arrangement and also this immediately above disclosed connection arrangement, the same label is used for the same part through-out the description and the claims rather than relabeling them in relation to the different connection arrangements.

The above mentioned object has also been achieved by a dowel configured to be attached to a tubular furniture part and to provide a part of a connection arrangement between the tubular furniture part and a third furniture part, the dowel comprising a connection portion having at least one ridge followed, as seen along a longitudinal direction, by at least one valley, wherein the connection portion is configured to extend from the second furniture part along a direction opposite the longitudinal direction towards a free end of the dowel, and an attachment portion having a neck portion followed, as seen along the longitudinal direction by a head portion, the head portion having in a first transverse direction an extension being greater than an extension of the neck portion in said first transverse direction and being greater than an extension of the head portion and an extension of the neck portion in a second transverse direction being orthogonal to the first transverse direction, wherein the dowel is configured to be attached to the tubular furniture part by inserting the attachment portion in an elongated through-going opening extending through a first wall of the tubular furniture part, wherein the dowel is during the insertion oriented with the first transverse direction being aligned with, or at least having a major component along, a longitudinal direction of the elongated through-going opening such that the head portion passes through the elongated through-going opening, and thereafter rotating the dowel in a first direction about an axis extending along the longitudinal direction such that the head portion interacts with an inside of the wall such that the head is prevented from being pulled out of the through-going opening.

A dowel of this kind is easy to attach to a tubular furniture part and it is capable of providing a strong connection arrangement by being securely attached to the tubular furniture part and by presenting a connecting portion capable of providing a strong connection with a recess having internal ridges interacting with the ridge and valley of the connection portion.

At least one end, preferably both ends, as seen along the first transverse direction, of the neck portion, may have a rotation blocking corner configured to interact with an edge of the elongated opening to thereby prevent rotation of the dowel in a second direction, opposite the first direction, about the axis, and a rotation allowing corner configured to pass along an edge of the elongated opening to thereby allowing rotation of the dowel in the first direction about the axis.

Thereby the dowel may be rotated from the orientation it has when being inserted to an intended orientation in which the dowel 51 is stopped from further rotation.

Preferably are both ends each provided with a rotation blocking corner and a rotation allowing corner wherein the two rotation blocking corners are arranged diagonally relative to each other and the two rotation allowing corners are arranged diagonally relative to each other.

The head portion may be asymmetric in its design and the elongated opening may be asymmetric in its design such that the head of the dowel is only insertable with the first transverse direction in one of two opposing orientations in which the first transverse direction is aligned with or has a major component along the longitudinal direction of the elongated through-going hold.

Thereby it may be controlled that the dowel is only insertable in the orientation that will, in combination with the rotation blocking and rotation allowing corners result in the intended orientation of the dowel.

In the above disclosed connection arrangement for connecting a third furniture part to a second furniture part, the second furniture part may be a tubular furniture part provided with an elongated through-going opening extending through a first wall of the tubular furniture part, and the dowel may be designed in accordance with the disclosure above in its most generic terms or in the preferred embodiments of the dowel.

The elongated through-going opening preferably has a width along a transverse direction of the elongated through-going opening being greater than the extension of the head portion and neck portion along the second transverse direction and being smaller than the extension of the head portion along the first transverse direction.

In one preferred embodiment, the inventive concept is realised in a furniture comprising a first furniture part, a second furniture part and a third furniture part, wherein the first and second furniture parts are connected to each other by the connection arrangement for connecting a first furniture part to a second furniture part as disclosed above in its most generic terms or in the preferred embodiments, and wherein the first and third furniture parts are connected to each other by the connection arrangement for connecting a second furniture part to a second furniture part as disclosed above in its most generic terms or in the preferred embodiments.

The invention may also in short be said to relate to a connection arrangement for connecting a first furniture part to a second furniture part, wherein the first furniture part comprises: a dowel and one or more abutment surfaces extending circumferentially around or being distributed circumferentially around the dowel, wherein the second furniture part comprises: a through-going opening extending through a wall and one or more abutment surfaces extending circumferentially around or being distributed circumferentially around the through-going opening, wherein the connection arrangement further comprises a connection member having a recess, the recess having a locking portion being configured to receive the dowel by a relative motion between the connection member and the first furniture part in a direction transverse to the longitudinal direction and being configured to interact with the neck portion of the dowel to counteract removal of the dowel from the locking portion along the longitudinal direction.

BRIEF DESCRIPTION OF THE DRAWINGS

The invention will by way of example be described in more detail with reference to the appended schematic drawings, which shows a presently preferred embodiment of the invention.

FIG. 2b is a partial cross-section of the view of FIG. 2a.

DETAILED DESCRIPTION OF PREFERRED EMBODIMENTS

Figure 1:
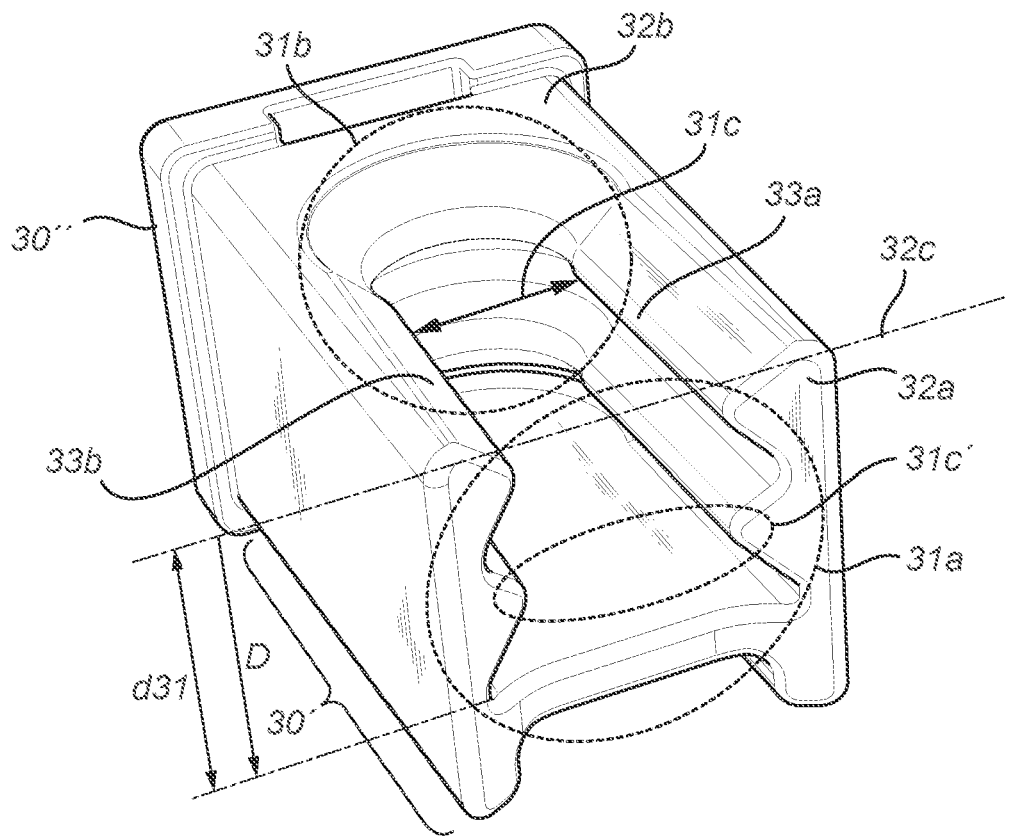
FIG. 1 discloses a connection member provided with a recess.
Figure 2A:
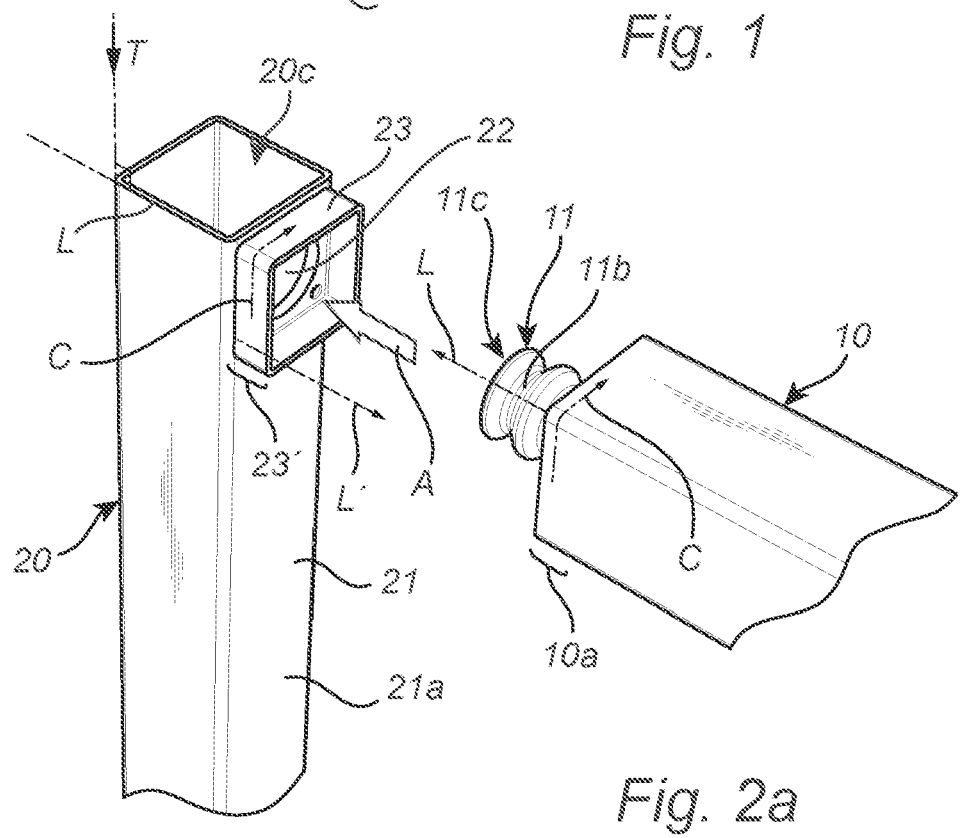
FIG. 2a discloses a first and a second furniture part.
Figure 5A:
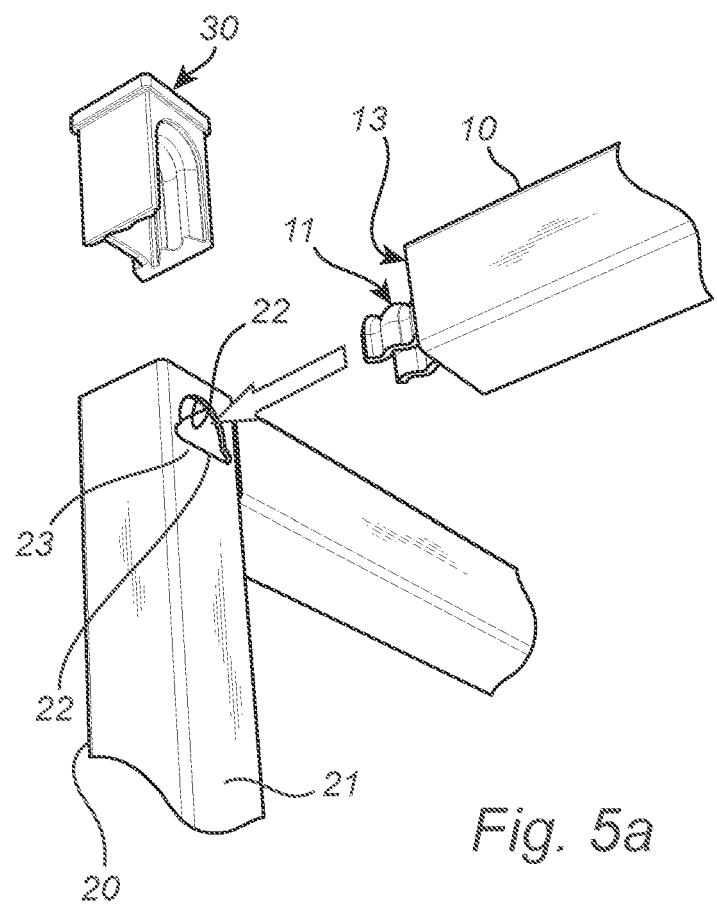
FIG. 5a discloses a first and a second furniture part and a connection member.

With reference initially to FIG. 1, FIG. 2a and FIG. 5a, there is disclosed a connection arrangement for connecting a first furniture part 10 to a second furniture part 20.

Figure 2B:
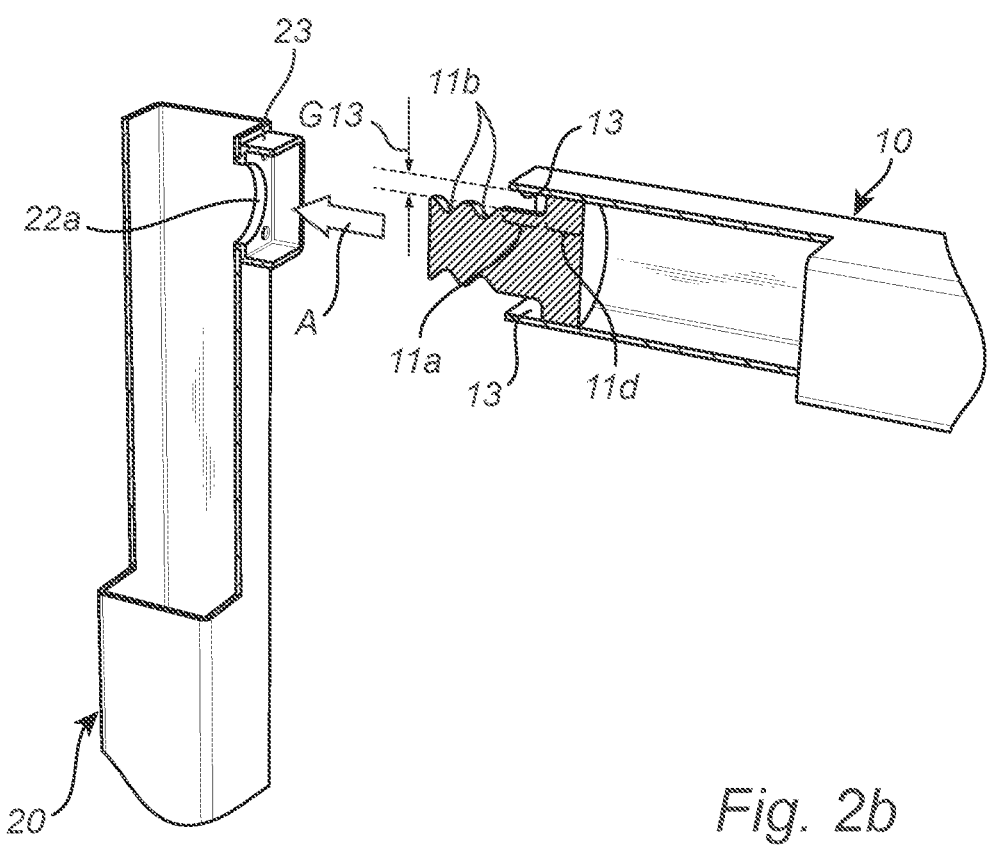
Figure 2C:
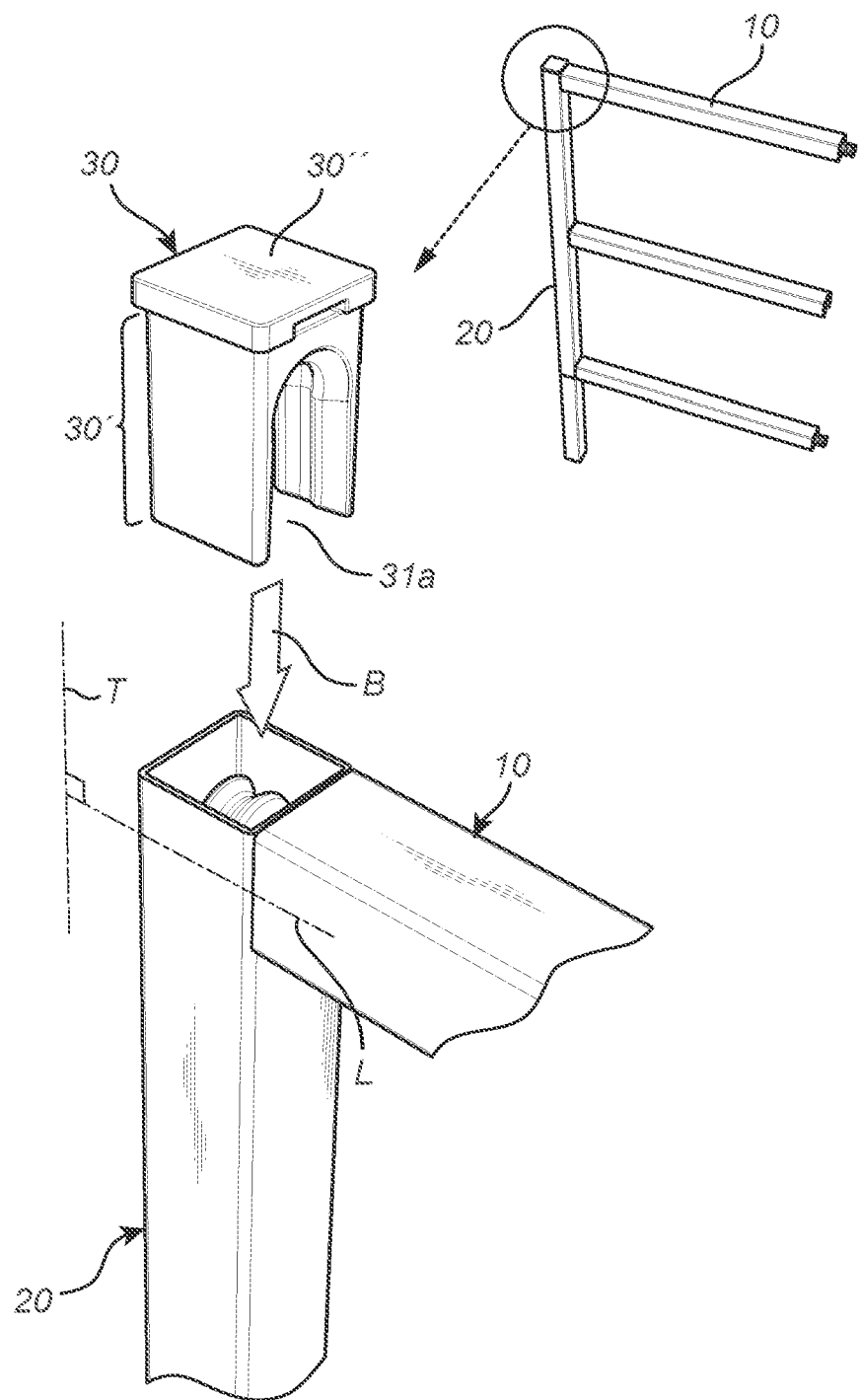
FIG. 2c discloses the first and second furniture parts being brought together and indicates the intended position of the connection member.
Figure 2D:
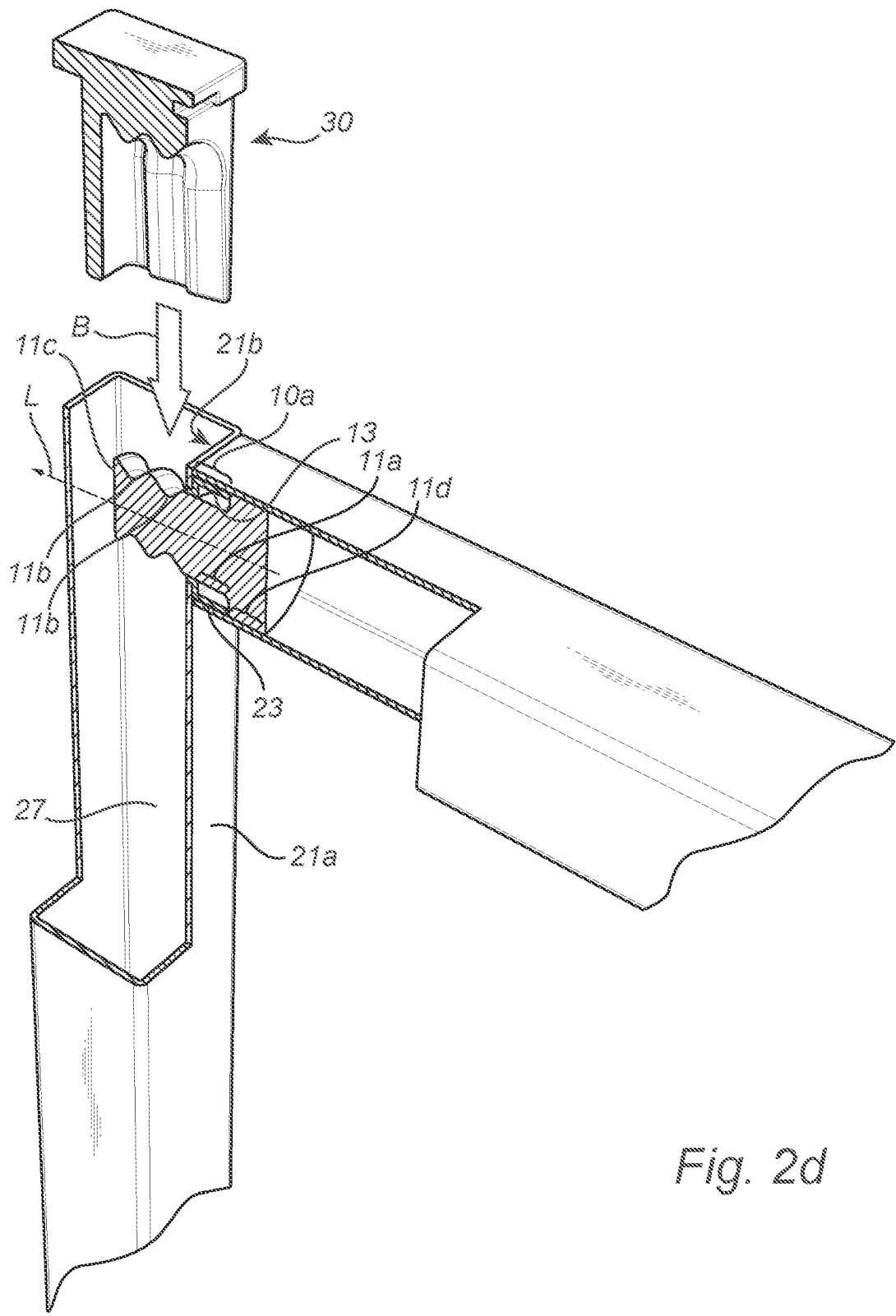
FIG. 2d is a partial cross-section of the view of FIG. 2c.

As shown in FIGS. 2a-e, the first furniture part 10 is tubular and has a main extension along a longitudinal direction L. The first furniture part 10 comprises a dowel 11 and a tubular section 10a forming an abutment surface 13. The dowel 11 extends from the first furniture part 10 along a longitudinal direction L towards a free end 11c of the dowel 11. The dowel 11 has as e.g. indicated in FIG. 2c, two neck portions 11b. The abutment surface 13 has an extension in the longitudinal direction L along a base portion 11a of the dowel 11. The abutment surface 13 also extends circumferentially C around the dowel 11. As shown in FIG. 2d, there is a circumferentially extending gap G13 between the base portion 11a and the abutment surface 13 formed by the tubular section 10a. In the disclosed embodiment, the dowel 11 and the through-going opening 22 have a circular cross-section. However, the dowel 11 and the through-going opening 22 may basically have any desired cross-sectional shape. A circular shape is preferred from a manufacturing perspective. Non-circular shapes may be preferred from the perspective that non-circular shapes may be used to define a specific rotational relative orientation between the first and second furniture parts 10, 20 about the longitudinal direction L.

The second furniture part 20 is tubular and comprises a through-going opening 22 and an abutment surface 23. The through-going opening 22 extends through a wall 21 of said second furniture part 20. The abutment surfaces 23 is formed of a tubular section 23' extending from a first side 21a of the wall 21 in a direction L' opposite the longitudinal direction L. The abutment surface 23 also extends circumferentially C around the through-going opening 22. The second furniture part 20 has a main extension along a transverse direction T being transverse to the longitudinal direction L.

It may be noted that in the preferred embodiment, the first furniture part is formed of from a square or rectangular tube and the abutment surface 13 extending around the dowel 11 is a continuous surface formed of the four sides of the cross-section of the square or rectangular tube.

As shown in FIG. 2c, the abutment surface 13 of the first furniture part and the abutment surface 23 of the second furniture part 10 are positioned on the respective furniture part 10, 20 such that, as the dowel 11 is inserted into the through-going opening 22, the abutment surface 13 of the first furniture part 10 abut the abutment surface 23 of the second furniture part 10 and counteract relative movement between the first and second furniture parts 10, 20 along all directions T transverse to the longitudinal direction L.

As indicated in FIGS. 2a-e, and disclosed in more detail in FIG. 1, the connection arrangement further comprises a connection member 30. The connection member 30 has a recess 31 which has a locking portion 31b being configured to receive the dowel 11 by a relative motion between the connection member 30 and the first furniture part 10 in a direction transverse T to the longitudinal direction L and being configured to interact with the neck portion 11b of the dowel 11 to counteract removal of the dowel 11 from the locking portion 31b along the longitudinal direction L.

As shown in FIG. 1, the recess 31 has an entrance opening 31a in a first surface 32a forming a corner 32c together with a second surface 32b. The first surface 32a is intended to face in the travel direction B and the second surface 32b is intended to face the wall 21 of the second furniture part 20. Such a recess 31 may be said to be an open ended recess 31. As indicated in FIGS. 2b-d, connection member 30 with such a recess 31 makes is easy to use; the user can position the first and second furniture parts 10, 20 in their intended position and then in a straight-forward motion push the connection member 30 over the dowel 11 such that the first and second furniture parts 10, 20 becomes interconnected. Such a design also facilitates manufacture of the connection member 30. The connection member 30 may e.g. be injection moulded in a single step process since the entrance opening 31a may be used as an extraction way for a removable core in an injection moulding tool with the core having the shape of the recess 31.

The recess 21 has a depth d31 as seen from the second surface 32b along a depth direction D extending along the longitudinal direction L. The recess is, as seen along the depth direction D, provided with two neck sections 31c, 31c' configured to interact with the respective neck portion 11b of the dowel 10. The two neck sections 31c, 31c' are arranged one after the other as seen along the depth direction D. Alternatively, it may be said that the neck sections 31c, 31c' are provided at different depths of the recess 31. Each neck section 31c, 31c' is be formed by two oppositely arranged internal ridges 33a, 33b extending along the second surface 32b and facing each other.

As shown in FIG. 1 and e.g. also in FIGS. 2c-d, the connection member 30 has a body part 30' in which the recess 31 is formed and an end part 30". The body par 30' is configured to be inserted into the tubular member 20. The end part 30" has slightly greater dimensions across the insertion direction B and is configured to close the end of the tubular member 20. The interaction between the end part 30" and the end of the tubular member 20 may also be used to provide a stop for the connection members 30 movement along the direction B as indicated by arrow K in FIG. 2d.

As indicated in FIGS. 2a-e, the first furniture part 10 and the second furniture part 20 are configured to be connected to each other by inserting as shown in FIG. 2a the dowel 11 through the through-going opening 22 from the first side 21a in an insertion direction A along the longitudinal direction L and bringing as shown in FIG. 2b-c said abutment surfaces 13, 23 of the first and second furniture parts 10, 20 into contact with each other, and positioning the connection member 30 on a second side 21b, opposite the first side 21a, of the wall 21 as indicated in FIG. 2b-c and moving the connection member 30 relative to the dowel 11 in a travel direction B along the transverse direction T such that the dowel 11 slides into the locking portion 31b to the position indicated in FIG. 2d.

The connection member 30 is positioned on the second side 21b by being inserted through an open end 20c in the second furniture part 20, the open end 20c facing in a direction B' opposite the travel direction B of the connection member 30.

As shown in FIG. 2d, the abutment surface 23 of the second furniture part 10 is configured to be arranged inside and abut the abutment surface 13 on an inside of the tubular section 10a. The extension of the tubular section 10a along the longitudinal direction is such that an open end 10c of the tubular section 10a abuts the first side 21a of the wall 21 thereby covering these parts of the connection arrangement inside the tubular section 10a.

Figure 2E:
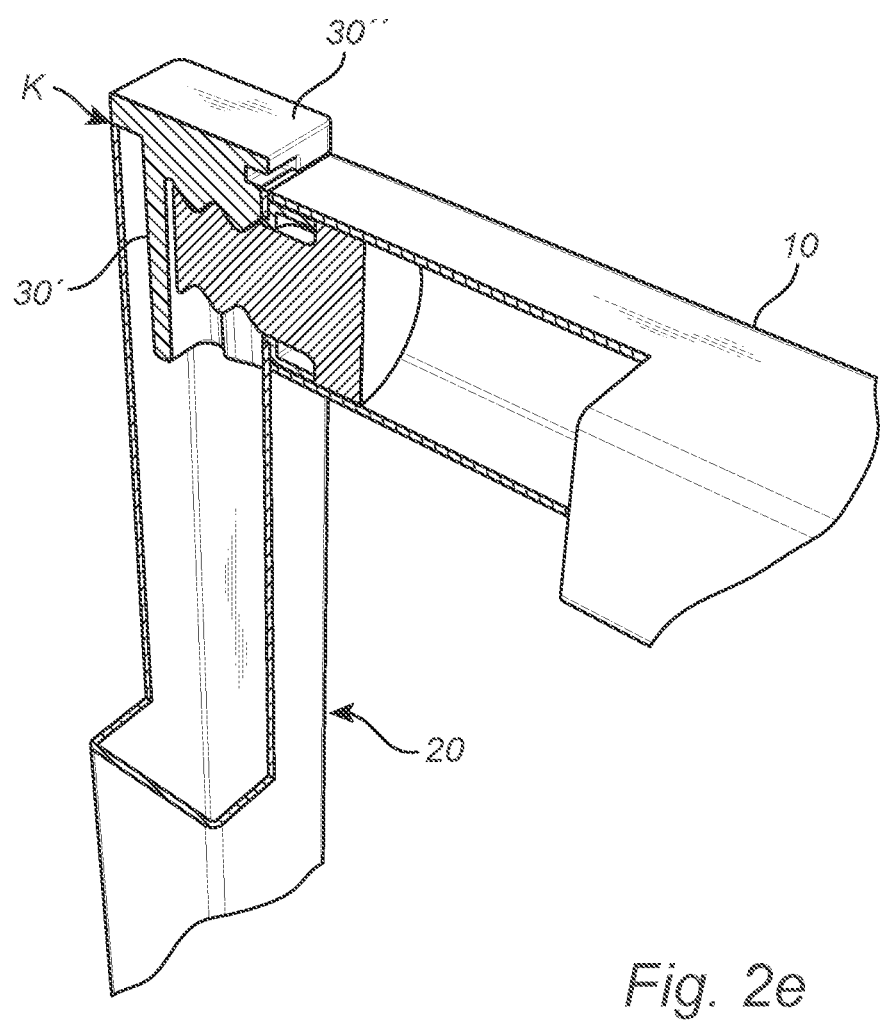
FIG. 2e is a partial cross-section disclosing the fully assembled connection arrangement.

As shown in FIGS. 2c-e, the dowel 10 is positioned partly into the open end 10c of the tubular member 10 such that it partly extends inside the tubular member 10 and partly extends past the open end 10c of the tubular member 10 along the longitudinal direction L.

The dowel 11 is a separate element being attached to the first furniture part 10. The dowel 11 may e.g. as disclosed in FIGS. 2c-e be attached to the first furniture part 10 by an attachment portion 11d being positioned further into the tubular member 10 than the base portion 11a.

In this embodiment, the base portion 11a may form an abutment surface which, when the dowel 11 is inserted through the through-going opening 22 of the wall 21, abuts an inner surface 22a of the through-going opening 22.

In FIGS. 5a-b, FIG. 6 and FIGS. 7a-b, there is disclosed an alternative embodiment to the embodiment shown in FIGS. 2a-e. In this embodiment, the abutment surface 13 of the first furniture part 10 is formed of the end surface of the tubular member 10 as indicated e.g. in FIGS. 5a and 7a. The abutment surface 23 of the second part 20 is formed of the outer surface 23 (or alternatively expressed; the first side 21a) of the wall 21 as indicated in FIG. 5a.

The dowel 11 is formed of a sheet metal piece being shaped basically into a longitudinally extending member having a U-shaped cross-section. It is oriented with its continuous curved bottom end facing the connection member 30. The legs of the U-shaped cross-section extend in parallel with the insertion direction B by which the connection member 30 is inserted into the second furniture part 20. The dowel 11 has as seen along the longitudinal direction L an attachment portion 11d, a base portion 11a, and a plurality of alternatingly arranged ridges 11c and valleys 11b. The attachment portion 11d is inserted into the tubular member 10 and is attached, such as by welding, to the inside of the tubular member 10.

Figure 5B:
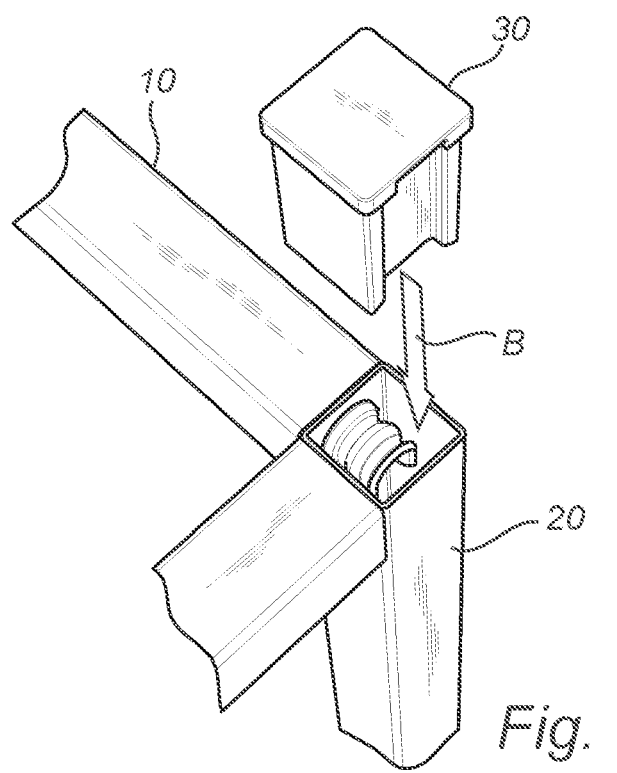
FIG. 5b discloses the first and second furniture parts being brought together and indicates the intended position of the connection member.
Figure 6:
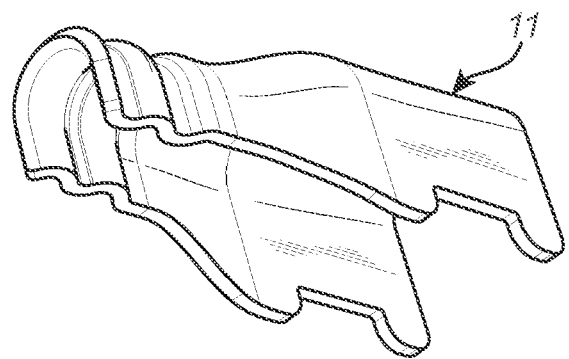
FIG. 6 discloses a dowel intended to be inserted into the first furniture part.
Figure 7A:
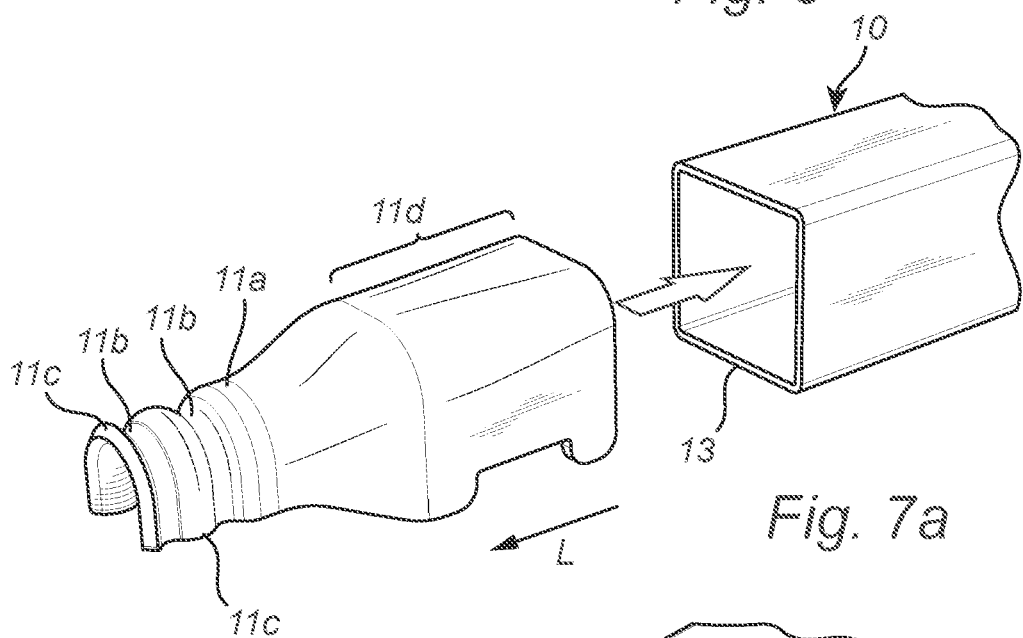
FIG. 7a discloses the orientation and insertion of the dowel into the first furniture part.
Figure 7B:
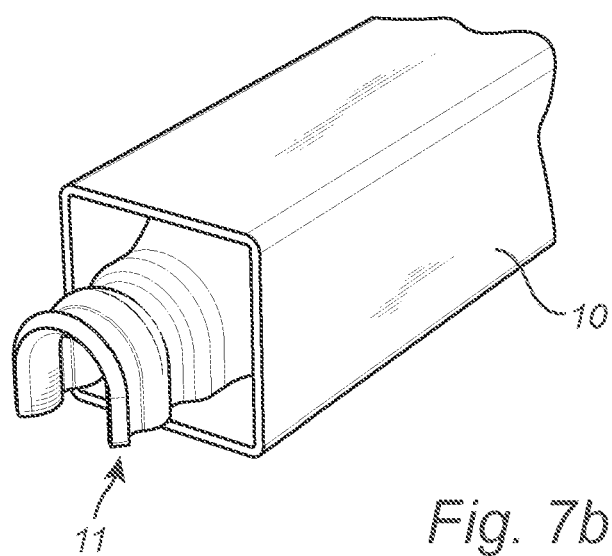
FIG. 7b discloses the dowel being inserted into the first furniture part.

As may be noted from FIGS. 5a-b, there are no longitudinally extending abutment surfaces 13, 23 in this embodiment. However, a locking effect preventing transversal relative movement of the first and second furniture parts 10, 20, is in this embodiment provided by the base portion 11a forming an abutment surface which, when the dowel 11 is inserted through the through-going opening 22 of the wall 21, abuts an inner surface or edge surface 22a of the through-going opening 22. The curved continuous bottom end of the U-shaped cross-section abuts a congruently shaped edge surface 22a. The free ends of the legs of the U-shaped cross section of the dowel 11 abuts two abutment surfaces formed in the through-going opening 22, the two abutment surfaces facing in a direction opposite the insertion direction B along which the connection member 30 is inserted into the second furniture part 20. The shape of the through-going opening may be shaped differently than the cross-sectional shape of the dowel 11 as long as the above mentioned abutment surfaces are provided.

With reference to FIGS. 3a-g, there is disclosed a connection arrangement for connecting a third furniture part 40 to a second furniture part 20.

The third furniture part 40 is tubular and has a main extension along the longitudinal direction L. The third furniture part 40 has an open end 41 facing in the longitudinal direction L as shown in FIG. 3d.

Figure 3A:
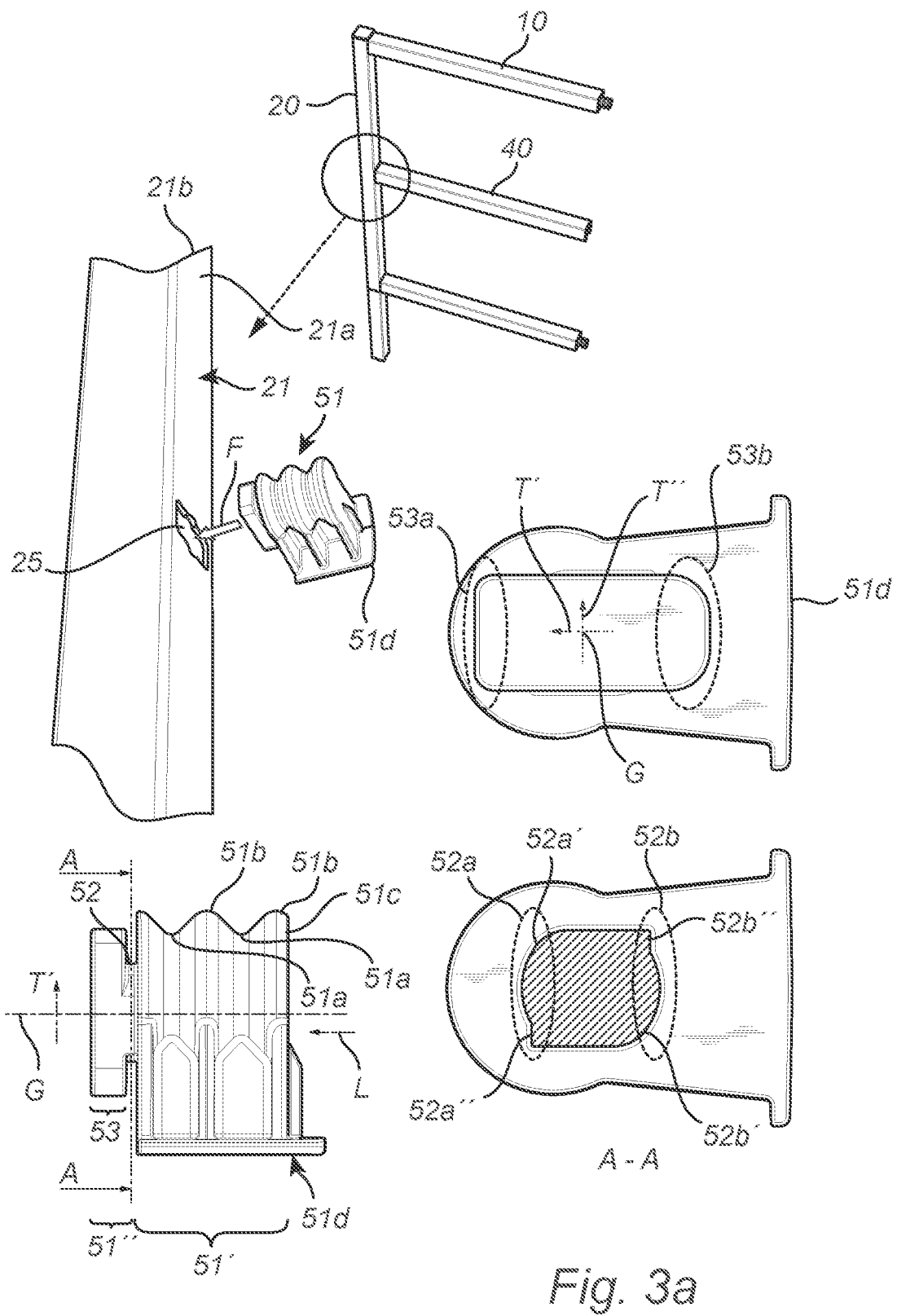
FIG. 3a discloses a dowel intended to be attached to the second furniture part in an elongated opening in the second furniture part.
Figure 3B:
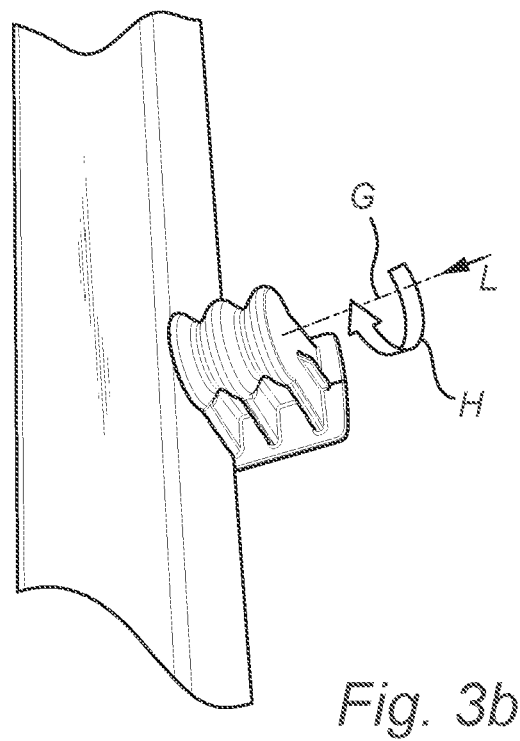
FIG. 3b discloses the dowel having been inserted into the elongated opening and indicates a rotation of the dowel into an attached position.
Figure 3C:
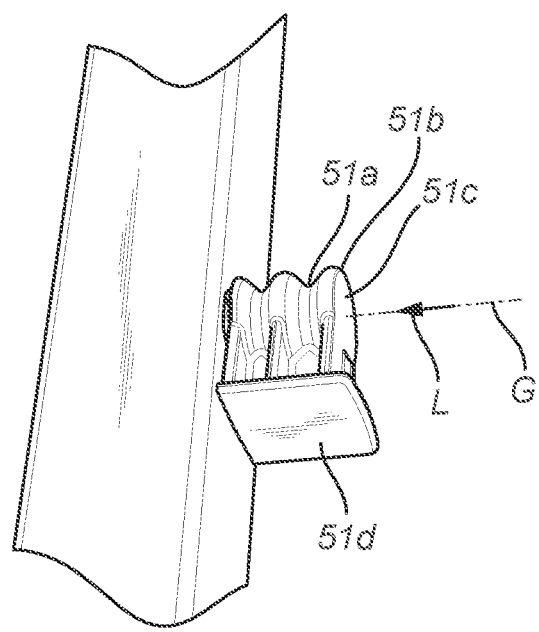
FIG. 3c discloses the dowel being attached to the second furniture part.

As shown in FIGS. 3a-c, the second furniture part 20 is configured to receive a dowel 51. The dowel 51 extends in the attached position from the second furniture part 20 along a direction L' opposite the longitudinal direction L towards a free end 51c of the dowel 51. As shown e.g. in FIG. 3a, the dowel 51 has two ridges 51b each followed, as seen along the longitudinal direction L, by a valley 51c.

Figure 3D:
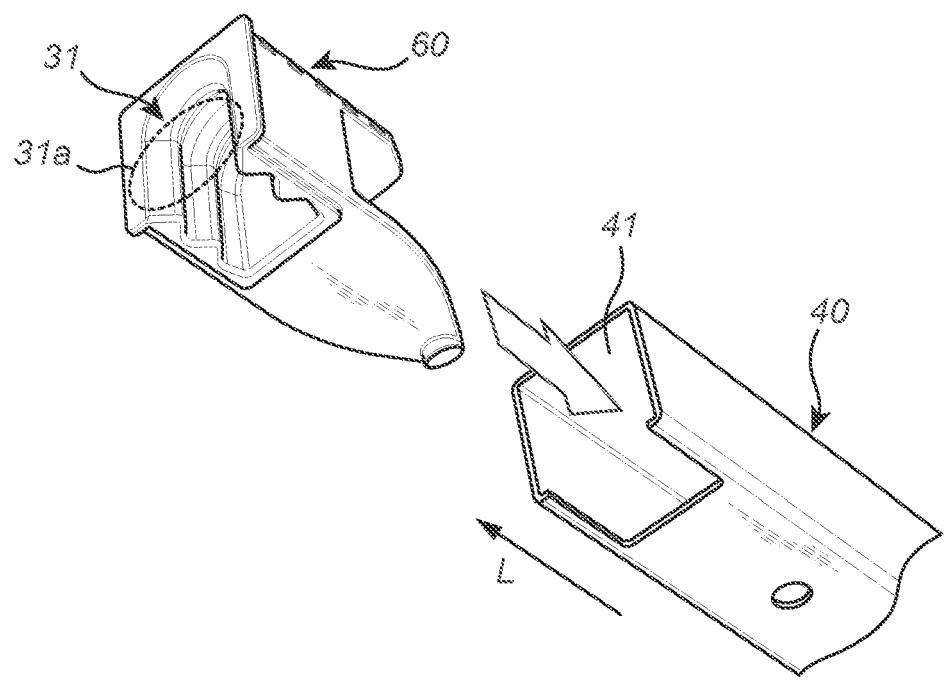
FIG. 3d discloses a connection member and the third furniture part and indicates the connection member being inserted into the third furniture part.

As shown in FIG. 3d, the connection arrangement further comprises a connection member 60 being configured to be inserted through the open end 41 and into the third furniture part 40. The connection member 60 has a recess 31 basically designed in the same manner as the recess 31 of the connection member 30. The recess 31 of the connection member 60 has a locking portion 31b being configured to receive the dowel 51 by a relative motion between the third furniture part 40 and the connection member 60 in a direction transverse T to the longitudinal direction L and being configured to interact with the valleys 51c of the dowel 51 to counteract removal of the dowel 51 from the locking portion 31b along the longitudinal direction L.

Figure 3E:
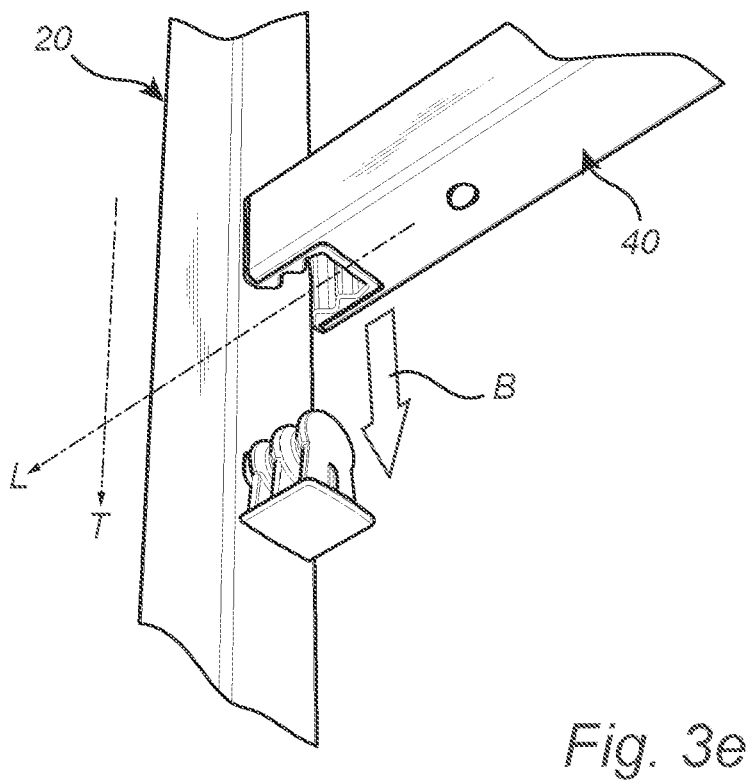
FIG. 3e indicates how the second and third furniture part are moved relative to each other to provide a connection between them.

The second furniture part 20 and the third furniture part 40 are configured to be connected to each other by:
inserting the connection member 60 at least partly into the third furniture part 40 as shown in FIG. 3d, and
moving the third furniture part 40 with the connection member 60 relative to the dowel 51 in a travel direction B along the transverse direction T such that the dowel 51 slides into the locking portion 31b of the connection member 60 as shown in FIG. 3e.

Figure 3F:
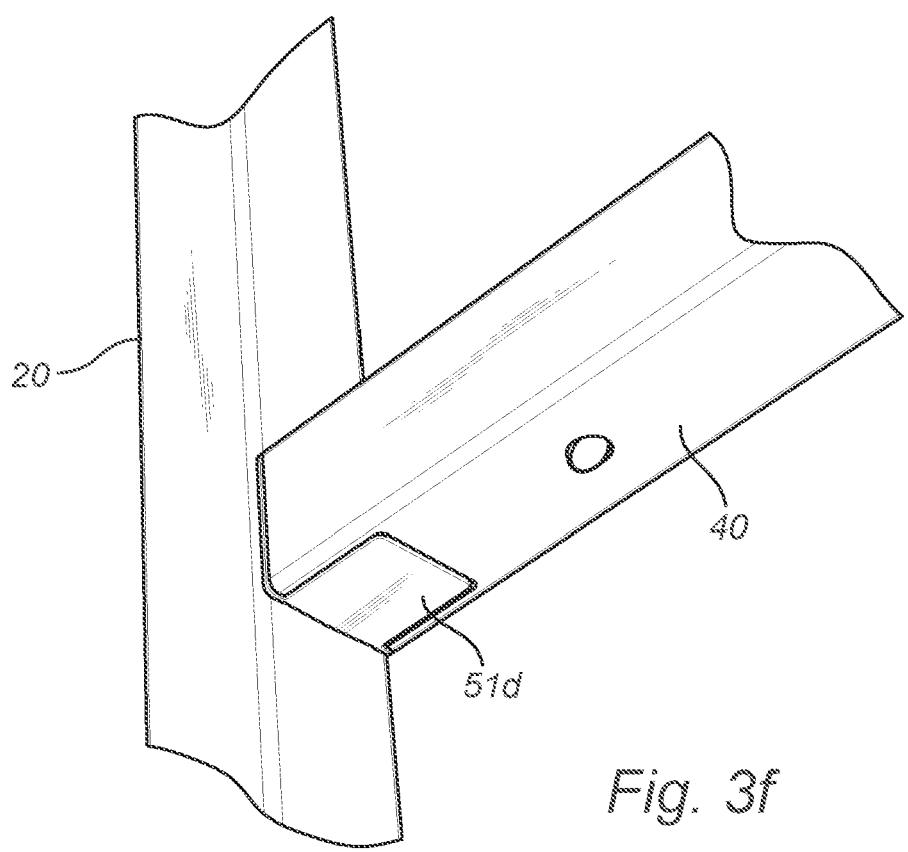
FIG. 3f discloses the second and third furniture parts being connected to each other.

In FIG. 3f, the second and third furniture parts 20, 40 are shown in the connected state. It may be noted that the connection arrangement is covered by the tubular furniture part 40 and a cover plate 51d on the dowel 51.

The dowel 51 will in the following be disclosed in more detail with reference mainly to FIGS. 3a-c. As mentioned above, the dowel 51 is configured to be attached to a tubular furniture part 20 and to provide a part of a connection arrangement between the tubular furniture part 20 and a third furniture part 40. The dowel 51 comprises in short a connection portion 51' and an attachment portion 51".

The connection portion 51' has the above mentioned two ridges 51b each followed, as seen along the longitudinal direction L, by a valley 51c. The connection portion 51' is configured to extend from the second furniture part along the direction L' opposite the longitudinal direction L towards the free end 51c of the dowel 51.

The attachment portion 51" has a neck portion 52 followed, as seen along the longitudinal direction L, by a head portion 53. The head portion 53 has in a first transverse direction T' an extension being greater than an extension of the neck portion 52 in said first transverse direction T' and being greater than an extension of the head portion 53 and an extension of the neck portion 52 in a second transverse direction T" being orthogonal to the first transverse direction T'.

As shown in FIG. 3a, the second furniture part 20 is provided with an elongated through-going opening 25 extending through a first wall 21 of the tubular furniture part 20. The elongated through-going opening 25 has, along its longitudinal extension, a width W (see FIG. 3g) along a transverse direction T25 of the elongated through-going opening 25 being greater than the extension of the head portion 53 and neck portion 52 along the second transverse direction T" and being smaller than the extension of the head portion 53 along the first transverse direction T'.

The dowel 51 is configured to be attached to the tubular furniture part 20 by
inserting F the attachment portion 51" in the elongated through-going opening 25 with the dowel 51, during the insertion, being oriented with the first transverse direction T' being aligned with, or at least having a major component along, a longitudinal direction L25 of the elongated through-going opening 25 such that the head portion 53 passes through the elongated through-going opening 25, and thereafter
rotating as shown in FIG. 3b the dowel 51 in a first direction H about an axis G extending along the longitudinal direction L such that the head portion 53 interacts with an inside 21b of the wall 21 such that the head 53 is prevented from being pulled out of the through-going opening 25.

The dowel 51 is shown in its attached position in FIG. 3c.

As shown in the cross-section A-A of FIG. 3a, both ends 52a, 52b, as seen along the first transverse direction T', of the neck portion 52, has
a rotation blocking corner 52a' configured to interact with an edge of the elongated opening 25 to thereby prevent rotation of the dowel 51 in a second direction, opposite the first direction H, about the axis G, and
a rotation allowing corner 52a" configured to pass along an edge of the elongated opening 25 to thereby allowing rotation of the dowel 51 in the first direction H about the axis G.

Thereby the dowel 51 may be rotated from the orientation it has when being inserted to an intended orientation in which the dowel 51 is stopped from further rotation.

The two rotation blocking corners 52a', 52b' are arranged diagonally relative to each other and the two rotation allowing corners 52a", 52b" are arranged diagonally relative to each other.

The head portion 53 may be asymmetric in its design and the elongated opening 25 may be asymmetric in its design such that the head 53 of the dowel 51 is only insertable with the first transverse direction T' in one of two opposing orientations in which the first transverse direction T' is aligned with or has a major component along the longitudinal direction L25 of the elongated through-going hold 25.

Figure 3G:
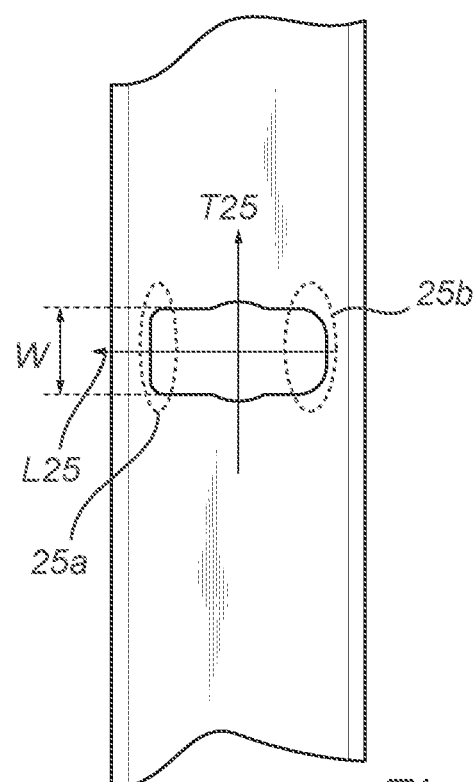
FIG. 3g discloses in planar view the elongated opening in the second furniture part.

In FIGS. 3a and 3g, it is shown that the head portion 53 has at one end 53a thereof relatively sharp corners and at the other end 53b thereof it has relatively rounded corners. Similarly, elongated opening 25 has at one end 25a thereof relatively sharp corners and at the other end 25b thereof it has relatively rounded corners. The radiuses of the corners are chosen such that the head 53 may only be inserted into the elongated opening 25 with the relatively sharp corners at the end 53a of the head 53 facing the end 25a of the elongated opening 25 having the relatively sharp corners.

Thereby it may be controlled that the dowel 51 is only insertable in the orientation that will, in combination with the rotation blocking corners 52a', 52b' and rotation allowing corners 52a", 52b" result in the intended orientation of the dowel 51.

Figure 8:
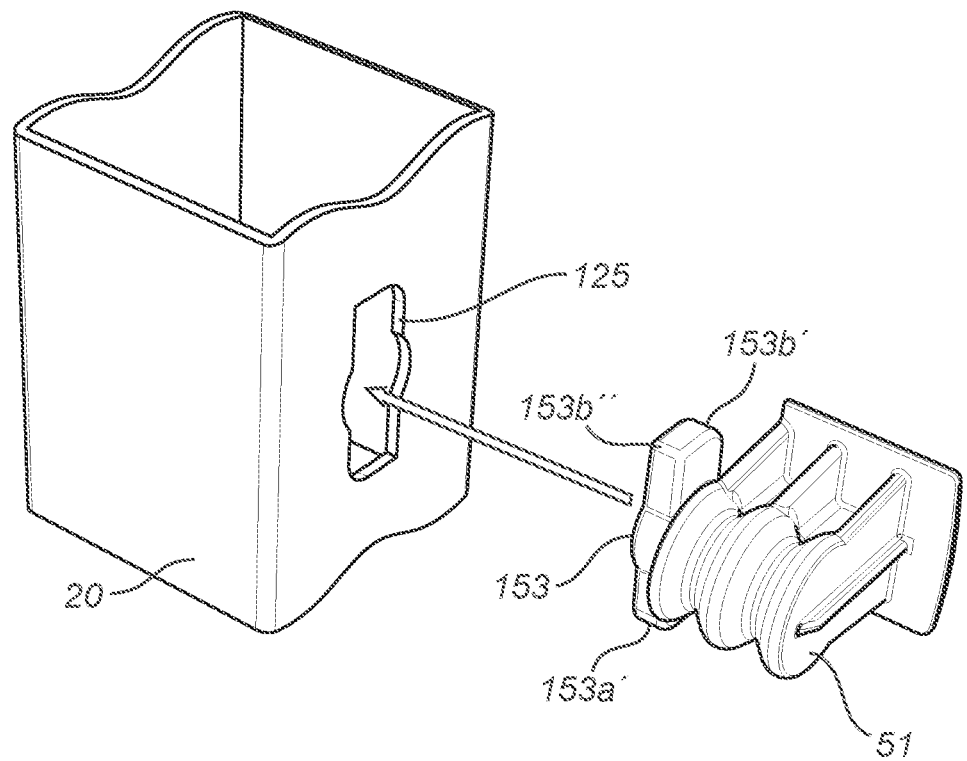
FIG. 8 discloses a dowel intended to be attached to the second furniture part in an elongated opening in the second furniture part.
Figure 8:
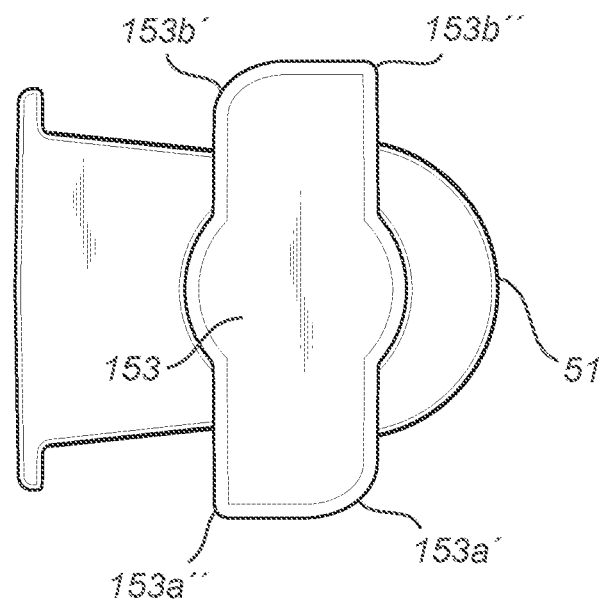

In an alternative embodiment shown in FIG. 8, the elongated through-going opening 125 may be extended along the extension of the second furniture part 20. In other words, the first transverse direction T' and the second transverse direction T'" described above would switch places. In this alternative embodiment the rotation blocking corners of the neck portion is omitted and instead rotation is blocked using rotation blocking corners 153a", 153b" at the ends 153a, 153b of the head portion 153. The rotation blocking corners 153a", 153b" is cooperating with the inner walls of the second furniture part 20 to prevent further rotation of the dowel 51. Thereby there is no need for an edge at the elongated opening to prevent rotation. Moreover, the head portion 153 comprises rotation allowing corners 153a', 153b' configured to allow rotation of the dowel 51 in the first direction H in the same manner as described with reference to FIG. 3b.

In one preferred embodiment, the inventive concept is realised in a furniture comprising a first furniture part 10, a second furniture part 20 and a third furniture part 40, wherein the first and second furniture parts 10, 20 are connected to each other by the connection arrangement for connecting a first furniture part 10 to a second furniture part 20 as disclosed above in its most generic terms or in the preferred embodiments, and wherein the first and third furniture parts 10, 40 are connected to each other by the connection arrangement for connecting a second furniture part 10 to a second furniture part 20 as disclosed above in its most generic terms or in the preferred embodiments.

Figure 4A:
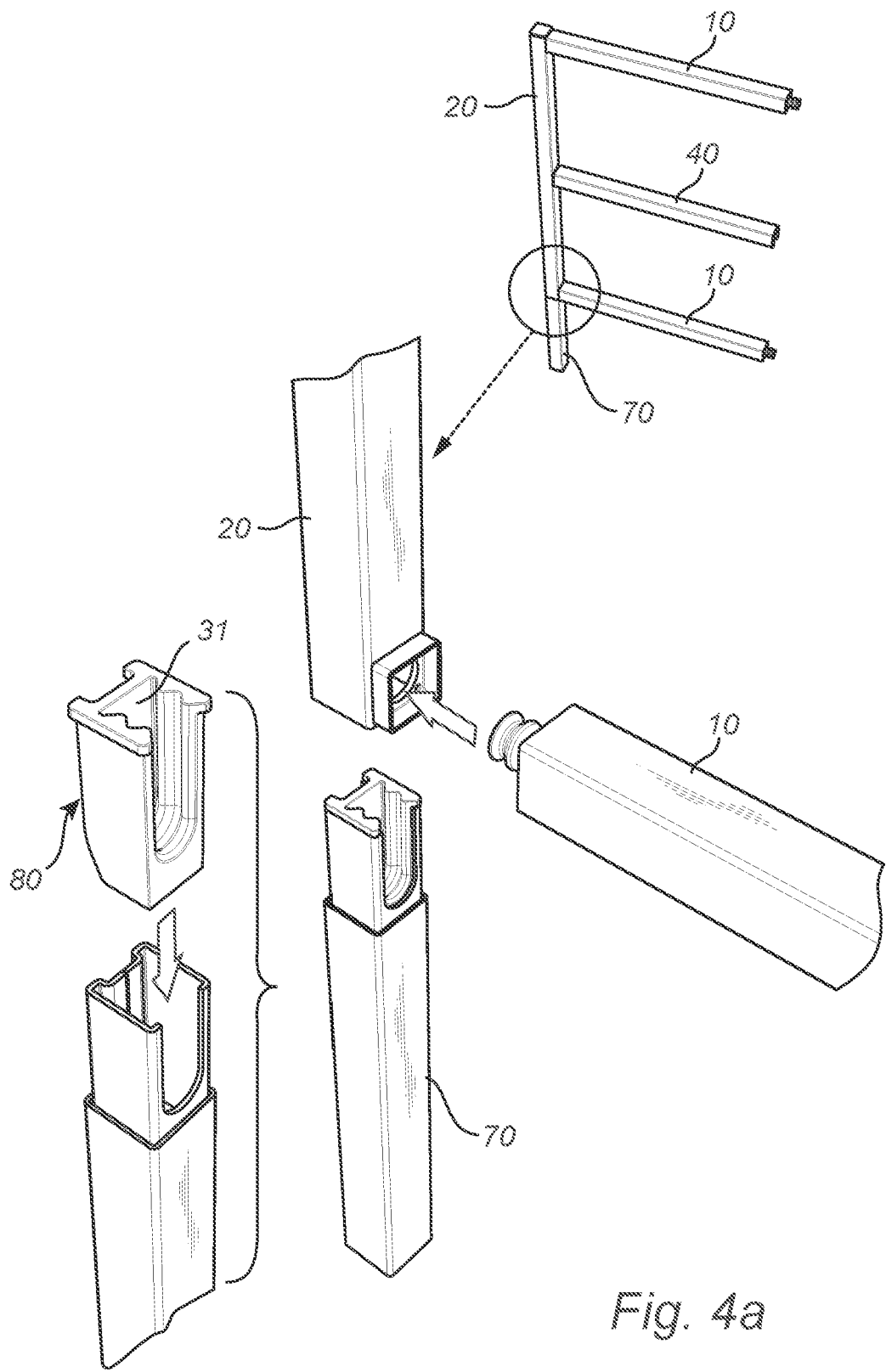
FIG. 4a discloses the components of an alternative embodiment of connecting a first furniture part to a second furniture part using a connection member being insertable into a fourth furniture part extending along the second furniture part.
Figure 4B:
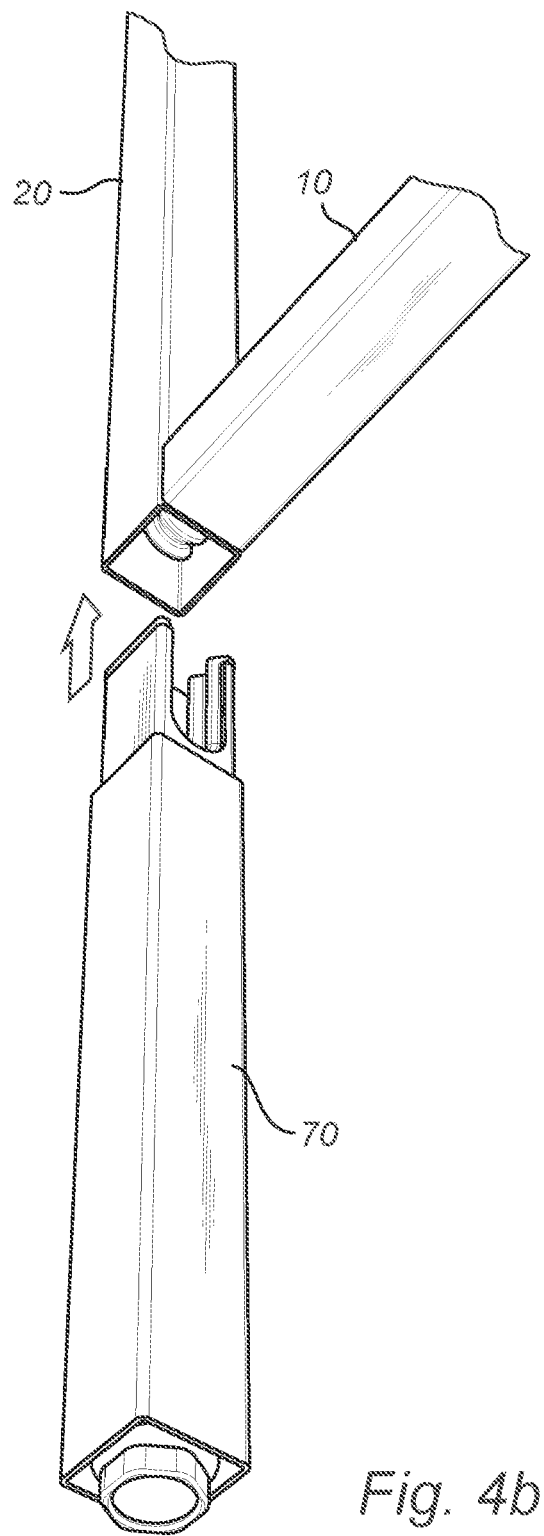
FIG. 4b discloses the first and second parts being brought together and indicates the intended position of the alternative connection member.
Figure 4C:
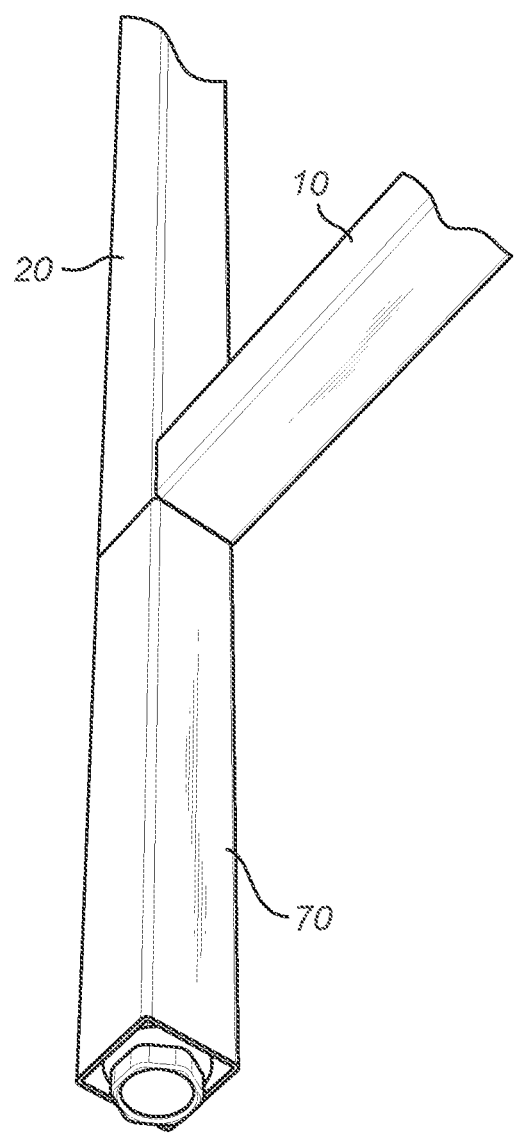
FIG. 4c discloses the fully assembled connection arrangement of the alternative embodiment.

In FIGS. 4a-c, there is shown a connection arrangement between a first furniture part 10 and a second furniture part 20 similar to the connection arrangement of FIGS. 2a-e. However, instead of using a connection member 30 of FIG. 1, there is in this latter connection arrangement used a connection member 80 which is insertable or form part of a tubular member 70. The tubular member 70 is intended to extend as a continuation of the second furniture part 20. This design is e.g. suitable to provide a leg 70 at the bottom of the furniture. The connection member 80 is provided with a recess 31 of the kind disclosed in detail with reference to FIG. 1.

It is also conceivable to combine the connection arrangement of FIGS. 1 and 2a-e with the connection arrangement of FIGS. 4a-c in a design where the furniture part 70 is provided with or receives a connection member 80 at one end thereof and is provided with a through-going opening 22 and abutment surfaces 23 at the other end thereof. With such a design, a plurality of such furniture parts 70 may be stacked on top of each other and connect with a first furniture part 10 at each such interconnection. At the top of such a stack the connection arrangement could end with a connection arrangement as disclosed in FIGS. 1 and 2a-e and at the bottom of such a stack the connection arrangement could end with a connection arrangement as disclosed in FIGS. 4a-c.

It may be noted that the furniture shown in the various figures as ending with a connection arrangement as shown in FIGS. 4a-c may alternatively end at both ends of the second furniture part 20 with a connection arrangement of the kind disclosed in FIGS. 1 and 2a-e.

It is contemplated that there are numerous modifications of the embodiments described herein, which are still within the scope of the invention as defined by the appended claims.

The one or more abutment surfaces 13 may for instance be a plurality of separate abutment surfaces each extending from a first side 21a of the wall 21 in a direction L' opposite the longitudinal direction L and being distributed relative to each other circumferentially C around the dowel 11.

The one or more abutment surfaces 23 may for instance be a plurality of separate abutment surfaces each extending from a first side 21a of the wall 21 in a direction L' opposite the longitudinal direction L and being distributed relative to each other circumferentially C around the through-going opening 22, It may be noted that in the preferred embodiment, the various furniture parts 10, 20, 40 are formed of from a square or rectangular tube. However, the furniture parts do not have to be formed from tubes. They may be solid parts provided with recesses or openings providing the spaces or cavities necessary to receive the dowels, connecting members, etc., which spaces or cavities are provided by the interior of the tubes of the preferred embodiments. It may also be noted that the shapes, of the tubular parts or solid parts, need not be square or rectangular. Other shapes, such as other kinds of polygons, circles, ovals, ellipsoids, are also conceivable.

As mentioned above, it may be noted that the expression furniture part may relate to different kinds of furniture. It may e.g. relate to separate free standing furniture, such as shelves, book shelves, TV-benches, side boards, tables, cupboards, etc. It may also relate to built-in cabinets or shelves, such as wall-hanged kitchen cabinets, wall-hanged kitchen shelves, etc. It may also relate to semi-built-in cabinets or shelves, such as wall hanged TV-benches, etc. Irrespective of it is built-in or free standing it may not only relate to furniture designed for storage, such as cabinets and shelves, but may also relate to furniture parts for furniture for other kinds of use. It may e.g. relate to furniture for sitting, such as sofas, benches, chairs, etc.

The invention claimed is:

1. Connection arrangement for connecting a first furniture part to a second furniture part,
   wherein the first furniture part comprises:
   a dowel extending from the first furniture part along a longitudinal direction towards a free end of the dowel, the dowel having at least one neck portion, wherein the dowel is formed of a sheet metal piece being shaped basically into a longitudinally extending member having a U-shaped cross-section, and wherein the second furniture part comprises:

a through-going opening extending through a wall of said second furniture part, and wherein the connection arrangement further comprises a connection member having a recess, the recess having a locking portion being configured to receive the dowel by a relative motion between the connection member and the first furniture part in a direction transverse to the longitudinal direction and being configured to interact with the neck portion of the dowel to counteract removal of the dowel from the locking portion along the longitudinal direction, wherein the first furniture part and the second furniture part are configured to be connected to each other by inserting the dowel through the through-going opening from the first side in an insertion direction along the longitudinal direction, and positioning the connection member on a second side, opposite the first side of the wall and moving the connection member relative to the dowel in a travel direction along the transverse direction such that the dowel slides into the locking portion.

2. The connection arrangement according to claim 1, wherein the first furniture part comprises one or more abutment surfaces, wherein the second furniture part comprises one or more abutment surfaces on a first side of the wall, the first side facing in a direction opposite the longitudinal direction, wherein the first furniture part and the second furniture part are configured to be connected to each other by bringing said abutment surfaces of the first and second furniture parts into contact with each other, characterised in that the abutment surfaces of the first furniture part is formed of an end surface of the first furniture part, and that the abutment surfaces of the second furniture part is formed of the first side of the wall, and in that a locking effect preventing transversal relative movement of the first and second furniture parts is provided by a base portion of the dowel forming an abutment surface which, when the dowel is inserted through the through-going opening of the wall, abuts an inner surface or edge surface of the through-going opening.

3. The connection arrangement according to claim 1, wherein the dowel is oriented with its continuous curved bottom end facing the connection member, and wherein legs of the U-shaped cross-section extend in parallel with the travel direction by which the connection member is inserted into the second furniture part.

4. The connection arrangement according to claim 1, wherein a curved continuous bottom end of a U-shaped cross-section of the dowel abuts a congruently shaped edge surface of the through-going opening.

5. The connection arrangement according to claim 1, wherein free ends of legs of the U-shaped cross section of the dowel abut two abutment surfaces formed in the through-going opening, the two abutment surfaces facing in a direction opposite the travel direction along which the connection member is inserted into the second furniture part.

6. Connection arrangement according to claim 1, wherein the recess has an entrance opening in a first surface forming a corner together with a second surface, the first surface being intended to face in the travel direction and the second surface being intended to face the wall of the second furniture part.

7. Connection arrangement according to claim 1, wherein the recess has a depth as seen from the second surface along a depth direction extending along the longitudinal direction and is, as seen along the depth direction, provided with at least one neck section configured to interact with the neck portion of the dowel, wherein the neck section is formed by two oppositely arranged internal ridges extending along the second surface and facing each other.

8. Connection arrangement according to claim 1, wherein the first furniture part is a tubular member having a main extension along the longitudinal direction, wherein the dowel is positioned partly into an open end of the tubular member such that it partly extends inside the tubular member and partly extends past the tubular member along the longitudinal direction.

9. Connection arrangement according to claim 1, wherein the second furniture part is a tubular member having an open end facing in a direction opposite the travel direction of the connection member and having a main extension along the transverse direction.

10. Furniture comprising a first furniture part, a second furniture part and a third furniture part, wherein the first and second furniture parts are connected to each other by a connection arrangement according to claim 1, wherein the third furniture part is tubular, has an open end facing in a longitudinal direction and has a main extension along the longitudinal direction, wherein the second furniture part comprises or is configured to receive a dowel extending from the second furniture part along a direction opposite the longitudinal direction towards a free end of the dowel, wherein the dowel has at least one ridge followed, as seen along the longitudinal direction, by at least one valley, wherein the second and third furniture parts are connected to each other by a connection arrangement which comprises:

a connection member having a recess and being configured to be inserted through the open end and into the third furniture part, wherein the recess has a locking portion being configured to receive the dowel by a relative motion between the third furniture part and the connection member in a direction transverse to the longitudinal direction and being configured to interact with the valley of the dowel to counteract removal of the dowel from the locking portion along the longitudinal direction, wherein the second furniture part and the third furniture part are configured to be connected to each other by inserting the connection member at least partly into the third furniture part, and moving the third furniture part with the connection member relative to the dowel in a travel direction along the transverse direction such that the dowel slides into the locking portion of the connection member.

11. Furniture according to claim 10, wherein the dowel is configured to be attached to a tubular furniture part and to provide a part of a connection arrangement between the tubular furniture part and a third furniture part, the dowel comprising a connection portion having at least one ridge followed, as seen along a longitudinal direction, by at least one valley, wherein the connection portion is configured to extend from the second furniture part along a direction opposite the longitudinal direction towards a free end of the dowel, and an attachment portion having a neck portion followed, as seen along the longitudinal direction by a head portion, the head portion having in a first transverse direction an extension being greater than an extension of the neck portion in said first transverse direction and being greater than an extension of the head portion and an extension of the neck portion in a second transverse direction being orthogonal to the first transverse direction, wherein the dowel is configured to be attached to the tubular furniture part by inserting the attachment portion in an elongated through-going opening extending through a first wall of the tubular furniture part, wherein the dowel is during the insertion oriented with the first transverse direction being aligned with, or at least having a major component along, a longitudinal direction of the elongated through-going opening such that the head portion passes through the elongated through-going opening, and thereafter rotating the dowel in a first direction about an axis extending along the longitudinal direction such that the head portion interacts with an inside of the wall such that the head is prevented from being pulled out of the through-going opening.

12. Furniture according to claim 11, wherein at least one end, preferably both ends, as seen along the first transverse direction, of the neck portion, has a rotation blocking corner configured to interact with an edge of the elongated opening to thereby prevent rotation of the dowel in a second direction, opposite the first direction, about the axis, and a rotation allowing corner configured to pass along an edge of the elongated opening to thereby allowing rotation of the dowel in the first direction about the axis.

13. Furniture according to claim 12, wherein the head portion is asymmetric in its design and the elongated opening is asymmetric in its design such that the head of the dowel is only insertable with the first transverse direction in one of two opposing orientations in which the first transverse direction is aligned with or has a major component along the longitudinal direction of the elongated through-going hold.

14. Furniture according to claim 11, wherein the tubular furniture part is provided with an elongated through-going opening extending through a first wall of the tubular furniture part.

15. Furniture according to claim 14, wherein the elongated through-going opening has a width along a transverse direction of the elongated through-going opening being greater than the extension of the head portion and neck portion along the second transverse direction and being smaller than the extension of the head portion along the first transverse direction.

* * * * *